United States Patent
Banham et al.

(10) Patent No.: US 11,005,107 B2
(45) Date of Patent: May 11, 2021

(54) MULTI-LAYER CATALYST DESIGN

(71) Applicant: NISSHINBO HOLDINGS INC., Tokyo (JP)

(72) Inventors: Dustin William H Banham, West Vancouver (CA); Siyu Ye, Burnaby (CA); Takeaki Kishimoto, Midori-ku (JP); Kyoung Bai, Vancouver (CA)

(73) Assignee: NISSHINBO HOLDINGS INC., Tokyo (JP)

( * ) Notice: Subject to any disclaimer, the term of this patent is extended or adjusted under 35 U.S.C. 154(b) by 105 days.

(21) Appl. No.: 16/329,112

(22) PCT Filed: Sep. 29, 2017

(86) PCT No.: PCT/US2017/054501
§ 371 (c)(1),
(2) Date: Feb. 27, 2019

(87) PCT Pub. No.: WO2018/064576
PCT Pub. Date: Apr. 5, 2018

(65) Prior Publication Data
US 2019/0207225 A1 Jul. 4, 2019

Related U.S. Application Data

(60) Provisional application No. 62/402,338, filed on Sep. 30, 2016.

(51) Int. Cl.
*H01M 4/86* (2006.01)
*H01M 8/1004* (2016.01)
*H01M 4/90* (2006.01)
*H01M 8/04291* (2016.01)
*H01M 8/1018* (2016.01)

(52) U.S. Cl.
CPC ....... *H01M 4/8657* (2013.01); *H01M 4/8642* (2013.01); *H01M 4/8663* (2013.01); *H01M 4/9041* (2013.01); *H01M 8/04291* (2013.01); *H01M 8/1004* (2013.01); *H01M 2004/8689* (2013.01); *H01M 2008/1095* (2013.01)

(58) Field of Classification Search
CPC ............. H01M 4/8663; H01M 8/1004; H01M 2008/1095
See application file for complete search history.

(56) References Cited

U.S. PATENT DOCUMENTS

2007/0269698 A1* 11/2007 Gu ...................... H01M 8/1004
429/483
2011/0143254 A1* 6/2011 Kongkanand ......... H01M 4/861
429/483
2012/0189942 A1 7/2012 Moose et al.

FOREIGN PATENT DOCUMENTS

WO 2016/007671 A1 1/2016

OTHER PUBLICATIONS

Jan. 12, 2017 International Search Report issued in International Patent Application PCT/US2017/054501.
Jan. 12, 2017 Written Opinion issued in International Patent Application PCT/US2017/054501.

* cited by examiner

Primary Examiner — Ladan Mohaddes
(74) Attorney, Agent, or Firm — Oliff PLC

(57) ABSTRACT

A method for improving the performance and/or stability of non-precious metal catalysts in fuel cells and other electrochemical devices. Improved membrane electrode assemblies (MEAs) and fuel cells containing the same are provided. Such MEAs include a catalyst layer made up of at least two sub-layers containing ionomers of differing equivalent weights. The sub-layers may optionally contain mixtures of ionomers. Also provided are methods of making and using the described devices.

20 Claims, 6 Drawing Sheets

MULTI-LAYER CATALYST DESIGN

BACKGROUND

Technical Field

The present disclosure relates to improving the performance and/or stability of non-precious metal catalysts in fuel cells and other electrochemical devices, including embodiments of such devices and methods of making and using the same.

Description of the Related Art

Fuel cells are electrochemical energy conversion devices that produce electricity from an external supply of fuel (e.g., hydrogen and oxygen). Solid polymer electrochemical fuel cells are a class of fuel cells that generally employ a membrane electrode assembly (MEA). A MEA typically includes a solid polymer electrolyte membrane, which is disposed between two electrodes (i.e., an anode and cathode).

In such fuel cells, hydrogen is supplied to the anode as fuel, and oxygen is supplied to the cathode as an oxidant. The anode and cathode are typically formed of porous conductive materials, for example woven graphite, graphitized sheets, or carbon paper. This enables the fuel (e.g., hydrogen) and oxidant (e.g., oxygen) to disperse over the surface of the membrane facing the anode and cathode, respectively. The anode and cathode each contain a catalyst layer (i.e., an anode catalyst layer and cathode catalyst layer, respectively). The catalyst layer typically includes a metal, an alloy, or a supported metal/alloy catalyst. The catalyst layer may also contain an ion conductive material (e.g., perfluorosulfonic acid polymer). Protons transferred through the membrane from the anode to the cathode are then combined with oxygen to form water, which is cleared from the fuel cell. The anode and the cathode each also typically contain a porous gas diffusion layer (GDL).

The anode and cathode half-cell reactions in hydrogen gas fuel cells are shown in the following equations:

(Equation 1)

(Equation 2)

The primary function of the anode is to oxidize hydrogen fuel to form protons and electrons (Equation 1, above). The primary function of the cathode is to reduce oxygen and form water (Equation 2, above).

The reaction at the cathode is inherently much slower. Thus, the cathode catalyst loading is typically higher than the anode catalyst loading.

In a fuel cell, the MEA is positioned between two electrically conductive flow field plates, which act as current collectors, afford mechanical support for electrodes, and provide passages for reactants and products of fuel cell operation. Flow field plates typically include flow channels to direct the flow of fuel and oxidant reactant to the anode and cathode, respectively, and to remove excess reactants and reaction products. Typically, a number of fuel cells are electrically coupled in series to form a fuel cell stack with a desired power output.

One of the challenges of commercial fuel cell applications centers on the performance of catalysts and catalyst layers. Fuel cells typically require scarce, expensive precious metals (e.g., platinum) to facilitate the oxygen reduction reaction (ORR) at the cathode. Frequently, large amounts of precious metals are required in order to obtain desirable operating voltages, thus driving up material costs. Although non-precious metal catalysts (NPMC) can reduce the cost of materials in some fuel cells, additional challenges are presented in relation to performance, stability, and durability of the catalysts.

In non-precious metal catalyst fuel cells, extremely high loading is required. The catalyst layers are therefore much thicker than those that would ordinarily be found in a precious metal catalyst fuel cell. In fuel cells that use precious metal catalysts, the thickness of the catalyst layer ranges from about 1 μm to about 15 μm. In contrast, in NPMC fuel cells, the catalyst layer is generally more than 100 μm thick.

Such thick catalyst layers can result in severe water management issues, especially in high relative humidity situations. Water that builds up at the cathode decreases performance and reduces oxygen transport to reaction sites, thereby decreasing the effective catalyst area.

Traditionally, catalyst layers are made using a single ionomer. Catalyst layers made with a low equivalent weight ionomer have excellent performance characteristics at low relative humidity. At high relative humidity, catalyst layers made with low equivalent weight ionomers tend to experience significant flooding. In contrast, catalyst layers made with a high equivalent weight ionomer experience low performance at low relative humidity, and excellent performance at high relative humidity. Catalyst layers with high equivalent weight ionomers may also experience poor catalyst adhesion or cohesion, and limited proton conductivity.

There has been considerable effort in the field to improve the performance and water management of non-precious metal fuel cell catalysts in varying relative humidity. While progress has been made in these areas, a need exists for fuel cell designs, and methods of making and using the same that provides for such improvements. The present disclosure addresses these issues and provides related advantages.

BRIEF SUMMARY

Embodiments of the present disclosure include a cathode catalyst layer, comprising: a first sub-layer comprising a non-precious metal catalyst and a first ionomer, the first sub-layer being in contact with a proton exchange membrane; and a second sub-layer comprising the non-precious metal catalyst and a second ionomer with an equivalent weight that is higher than an equivalent weight of the first ionomer. Further embodiments of the present disclosure include a cathode catalyst layer, comprising: a first layer comprising a non-precious metal catalyst and a first ionomer with a low equivalent weight, the first layer being in contact with a proton exchange membrane; and a second layer comprising the non-precious metal catalyst and a second ionomer with a high equivalent weight.

In some embodiments, the first layer further comprises the second ionomer. In other embodiments, the first layer further comprises a third ionomer, the third ionomer having an equivalent weight that is greater than the equivalent weight of the first ionomer. In further embodiments, the second layer further comprises a third ionomer, the third ionomer having an equivalent weight that is greater than the equivalent weight of the first ionomer. In other embodiments, the second layer further comprises a fourth ionomer, the fourth ionomer having an equivalent weight that is greater than the equivalent weight of the second ionomer. In embodiments, the cathode catalyst layer further comprises a third layer comprising a fourth ionomer with an equivalent weight that is greater than the equivalent weight of the second ionomer.

Further embodiments of the disclosure include a membrane electrode assembly, comprising: a proton exchange membrane; a cathode comprising: a gas diffusion layer (GDL); a cathode catalyst layer (CCL) comprising: a first sub-layer comprising a non-precious metal catalyst and a first ionomer, the first sub-layer being in contact with the proton exchange membrane; and a second sub-layer comprising the non-precious metal catalyst and a second ionomer with an equivalent weight that is higher than an equivalent weight of the first ionomer; and an anode. Embodiments of the disclosure also include a membrane electrode assembly, comprising: a proton exchange membrane; a cathode comprising: a gas diffusion layer; a cathode catalyst layer comprising: a first layer comprising a non-precious metal catalyst and a first ionomer with a low equivalent weight, the first layer being in contact with the proton exchange membrane; and a second layer comprising the non-precious metal catalyst and a second ionomer with a high equivalent weight; and an anode.

In some embodiments, the first layer further comprises the second ionomer. In other embodiments, the first layer further comprises a third ionomer, the third ionomer having an equivalent weight that is greater than the equivalent weight of the first ionomer. In further embodiments, the second layer further comprises a third ionomer, the third ionomer having an equivalent weight that is greater than the equivalent weight of the first ionomer. In other embodiments, the second layer further comprises a fourth ionomer, the fourth ionomer having an equivalent weight that is greater than the equivalent weight of the second ionomer. In embodiments, the cathode catalyst layer of the membrane electrode assembly further comprises a third layer comprising a fourth ionomer with an equivalent weight that is greater than the equivalent weight of the second ionomer.

Additional embodiments of the disclosure include a fuel cell system comprising a membrane electrode assembly as described herein.

BRIEF DESCRIPTION OF THE SEVERAL VIEWS OF THE DRAWINGS

In the figures, identical reference numbers identify similar elements or acts. The sizes and relative positions of elements in the figures are not necessarily drawn to scale. For example, the shapes of various elements and angles are not drawn to scale and some of these elements are arbitrarily enlarged and positioned to improve figure legibility. Further, the particular shapes of the elements as drawn, are not intended to convey any information regarding the actual shape of the particular elements, and have been solely selected for ease of recognition in the figures.

DETAILED DESCRIPTION

Figure 1:
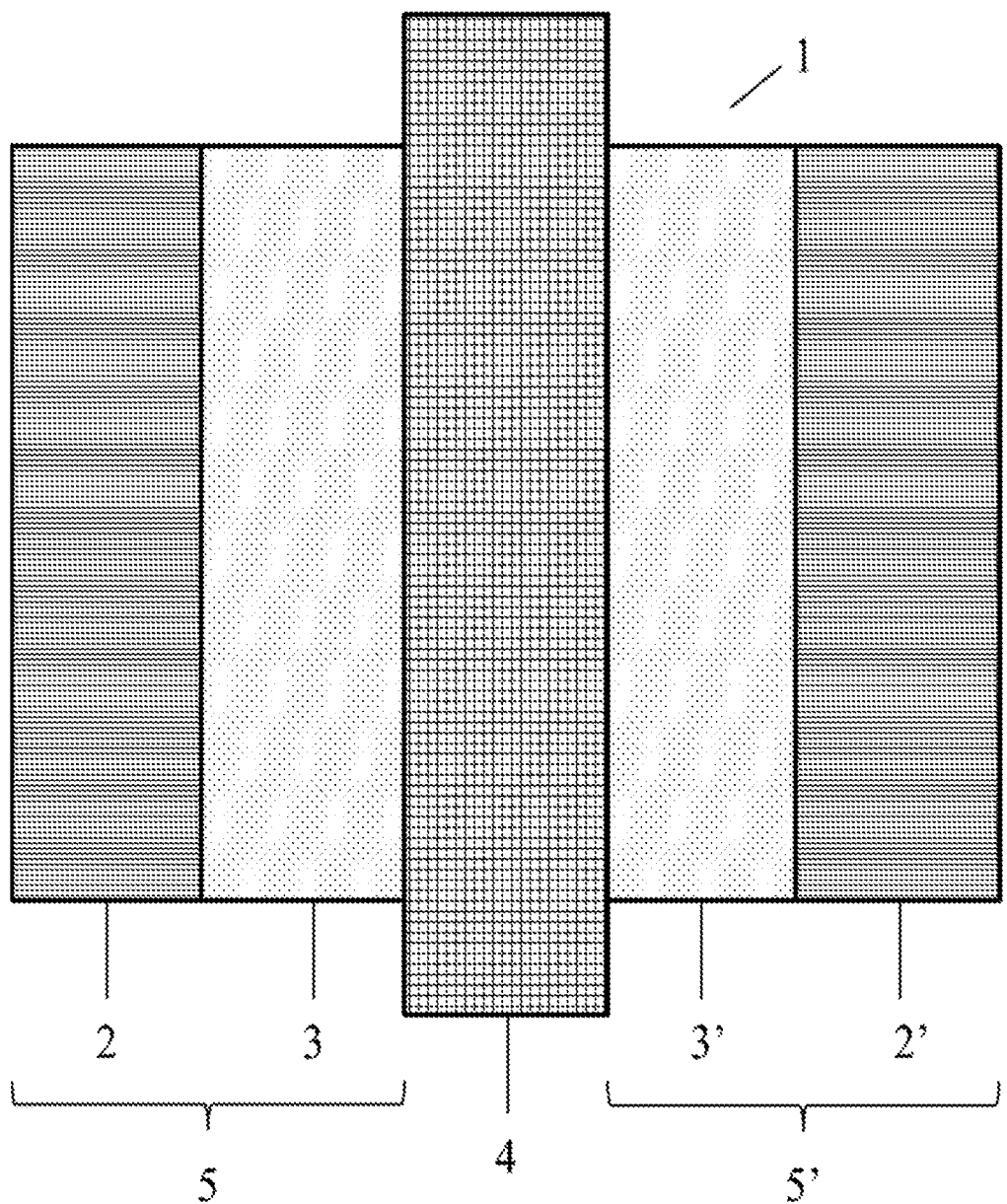
FIG. 1 is a schematic cross-sectional view showing an illustrative membrane electrode assembly.

The particulars described herein are by way of example and are only for purposes of illustrative discussion of embodiments of the present disclosure. The use of any and all examples, or exemplary language (e.g., "such as") provided herein is merely intended to better illuminate the disclosure and does not pose a limitation on the scope of the disclosure as claimed. No language in the specification should be construed as indicating any non-claimed element is essential to the practice of the disclosure. Further, all methods described herein can be performed in any suitable order unless otherwise indicated herein or otherwise clearly contradicted by context.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein.

Each embodiment disclosed herein can comprise, consist essentially of, or consist of a particular stated element, step, ingredient, or component. As used herein, the term "comprise" or "comprises" means "includes, but is not limited to," and allows for the inclusion of unspecified elements, steps, ingredients, or components, even in major amounts. As used herein, the phrase "consisting of" excludes any element, step, ingredient, or component that is not specified. As used herein, the phrase "consisting essentially of" limits the scope of the embodiment to the specified elements, steps, ingredients, or components, and to those that do not materially affect the basic and novel characteristics of the claimed disclosure.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The term "about" has the meaning reasonably ascribed to it by a person of ordinary skill in the art when used in conjunction with a stated numerical value or range, e.g., denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Definitions used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art.

The present disclosure is generally directed to fuel cells, such as polymer electrolyte membrane (PEM) fuel cells, methanol fuel cells, alkaline fuel cells, or phosphoric acid fuel cells, and other electrochemical devices that use non-precious metal catalysts (NPMC), which have improved performance, as well as methods of making and using the same. As used herein, the terms "polymer electrolyte membrane fuel cell," "proton exchange membrane fuel cells," "PEMFC," or "PEM fuel cell" refer to fuel cells that include a solid polymer as an electrolyte and porous electrodes. In embodiments, PEMFCs are fueled by hydrogen gas, and use hydrogen, oxygen, and water to operate. "Phosphoric acid fuel cell" refers to fuel cells that comprise liquid phosphoric acid as electrolyte. For example, a phosphoric acid fuel cell can comprise phosphoric acid in a bonded silicon carbide matrix and porous electrodes.

"Non-precious metal" or "NPM" refers to a metal other than ruthenium, osmium, rhodium, iridium, palladium, platinum, gold, or silver. For example, non-precious metals include nickel, iron, cobalt, chromium, copper, tungsten, selenium, and tin. In some embodiments, the NPM is a transition metal. In some embodiments, the NPM is a Group 8 metal, a Group 9 metal, a Group 10 metal, or combinations thereof. In other embodiments, the NPM is a Period 4 metal. In embodiments, the NPM is Iron (Fe), Cobalt (Co), or Nickel (Ni). In embodiments, the NPM is Iron. In other embodiments, the NPM is nickel. In embodiments, the NPMC comprises a transition metal/nitrogen/carbon (M/N/C) catalyst, wherein the metal is Fe or Co. In certain embodiments, the NPM is in the form of a metal oxide, metal nitride, metal carbide, or metal chalcogenides. In some embodiments, the NPMC comprises a carbon material with unique nanostructures, for example nanotubes, nanocones, graphene, nanohorns, fullerenes, and the like. In some specific embodiments, the NPMC comprises a doped carbon material, for example a nitrogen and/or boron-doped carbon material.

"Transition metals" include scandium (Sc), titanium (Ti), vanadium (V), chromium (Cr), manganese (Mn), iron (Fe), cobalt (Co), nickel (Ni), copper, (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), darmstadtium (Ds), roentgenium (Rg), and copernicium (Cn).

"Group 8" elements include iron (Fe), ruthenium (Ru), osmium (Os), and hassium (Hs). "Group 9" elements include cobalt (Co), rhodium (Rh), iridium (Ir), and meitnerium (Mt). "Group 10" elements include nickel (Ni), palladium (Pd), platinum (Pt) and darmistadium (Ds).

"Period 4 metal" includes scandium (Sc), titanium (Ti), vanadium (V), chromium (Cr), manganese (Mn), iron (Fe), cobalt (Co), nickel (Ni), copper (Cu), zinc (Zn), and gallium (Ga).

In order to describe particular embodiments of the devices and methods of the disclosure, reference is made to the appended figures. This discussion should not be construed as limiting, as the particular details of the embodiments described herein are by way of example and are for purposes of illustrative discussion of embodiments of the present disclosure.

FIG. 1 shows the configuration of an embodiment of a membrane electrode assembly (MEA) 1. A first electrode 5 is disposed at one side of a polymer electrolyte membrane 4. As used herein, the term "polymer electrolyte membrane" or "proton exchange membrane" (PEM), refers to a semipermeable membrane made from ionomers that acts as a reactant barrier. PEMs can be made of any suitable proton conducting material or ionomer, such as Nafion®, BAM®, Flemion®, Aquivion®, Dyneon®, GORE-SELECT®, and Aciplex®. In some embodiments, the PEM is made of Nafion®.

The term "ionomer" is used to describe any of a class of polymer materials including thermoplastic resins stabilized by ionic cross-linkages comprising repeat units, electrically neutral and ionized, or bonded to a polymer backbone. Examples of ionomers include perfluorosulfonic acid ionomers (PFSA), Nafion®, Nafion® polyaniline, sulfonated polysulfone, sulfonated poly(ether sulfone), poly(vinylidene)fluoride (PVDF), Nafion® PTFE, Nafion® Krytox, polyvinylidene fluoride-chloro tetrafluoroethylene (PVDF-CTFE) co-polymer, poly(ethylene glycol)/4-dodecylbenzene sulfonic acid (PEG)/(DBSA), sulfonated styrene-(ethylene-butylene)-sulfonated styrene (SEBSS), poly-(ethylene oxide)s (PEOs), polyvinyl alcohol (PVA), poly-vinylidene fluoride/poly-acrylonitrile (PVDF/PAN), PVDF-g-PSSA, poly(styrene sulfonic acid), sulfonated poly(ether ether ketone) (SPEEK), or combinations thereof. In various embodiments, suitable membranes and/or ionomers are produced by Asahi Kasei®, 3M®, DuPont®, Ballard Advanced Materials®, Solvay®, and Gore®.

The electrodes 5 and 5' also each include an electrode substrate 2 and 2', respectively, and a catalyst layer 3 and 3', respectively. The electrode substrates 2 and 2' each include a gas diffusion layer. The "gas diffusion layer" or "GDL" refers to a porous, electrically conductive layer that connects the catalyst and the current collector. The anode gas diffusion layer and cathode gas diffusion layer are typically also thermally conductive, adequately stiff for mechanical support of the catalyst layer and membrane, chemically inert, sufficiently porous to allow for gas diffusion, and thin and lightweight for high power density. In embodiments, the GDL helps to remove the produced water in order to prevent flooding of the fuel cell.

Examples of materials used for GDLs include, woven and non-woven porous carbonaceous substrates, such as carbon fiber paper and carbon fabrics, and carbonized or graphitized carbon fiber non-woven mats. Suitable porous substrates include TGP-H-060, TGP-H-090, AvCarb® P50 and EP-40, and GDL 24 and 25 series material. In embodiments, the GDLs can be hydrophobized (e.g., coated with polytetrafluoroethylene). In some embodiments, the GDLs include at least one gas diffusion sublayer having carbon or graphite in fibrous or particulate form.

The GDL includes a microporous layer, which is in contact with the catalyst layer. A "microporous layer" or "MPL" is a layer that is used to improve the smoothness of the GDL and the catalyst layer interface and to improve the uniformity of gas diffusion into the catalyst layer. In some embodiments, an additive, such as mesoporous carbon, carbon nanotubes, carbon nanofibers, or graphene is present in the MPL.

The cathode catalyst layer 3' includes an NPM, an NPM alloy, or a supported NPM or NPM-alloy catalyst, and the anode catalyst layer 3 includes a precious metal catalyst. Each catalyst layer may also contain an ion conductive material (e.g., perfluorosulfonic acid polymer). In embodiments, the anode and cathode catalyst layers contain a binder, such as a hydrophobic binder (e.g., PTFE), an ionomer, or combinations thereof. In further embodiments, the catalyst layers may each independently contain one or more hygroscopic fillers, such as silica, alumina, zirconia, titania, and tungsten trioxide.

Figure 2:
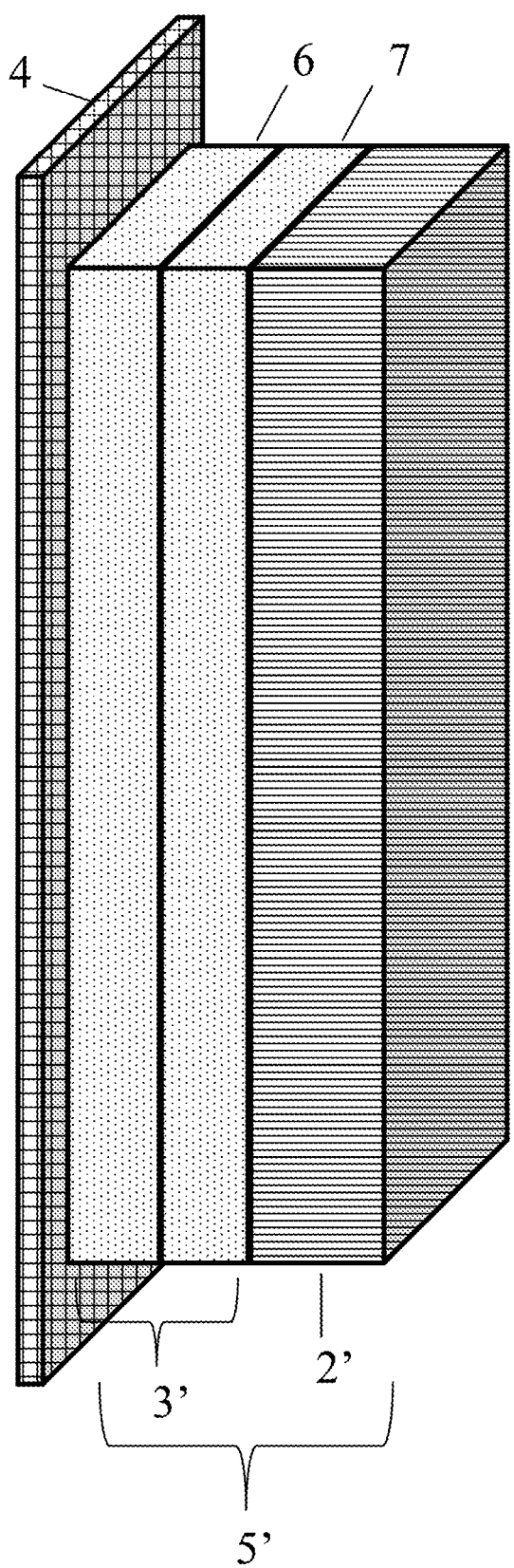
FIG. 2 is a schematic view showing an embodiment of a cathode, including a bi-layer catalyst layer, and a PEM.

In order to better illustrate embodiments of the disclosure, a closer view of an embodiment of a PEM 4 and a cathode 5' are shown in FIG. 2. As can be seen, in this embodiment, the catalyst layer 3' includes two layers, a first catalyst sub-layer 6 and a second catalyst sub-layer 7, which is positioned between the first catalyst sub-layer 6 and the electrode substrate 2'. Although two catalyst sub-layers 6 and 7 are shown in FIG. 2, more sub-layer may be present. In some embodiments, the cathode catalyst is made up of two sub-layers, three sub-layers, four sub-layers, or five sub-layers. Each of the cathode catalyst layers may have the same catalyst or a different catalyst.

Each of the catalyst layers or sub-layers contains at least one ionomer. In embodiments, one or more of the catalyst sub-layers contain a mixture of two or more ionomers. In some embodiments, one or more of the catalyst sub-layers contain a mixture of two ionomers, three ionomers, four ionomers, or five ionomers. In such embodiments, the mixture can be homogenous. In this context, "homogeneous" means that the constituents are substantially uniformly dispersed in the mixture.

In embodiments, the first catalyst sub-layer contains a first ionomer and the second catalyst sub-layer contains a second ionomer with higher equivalent weight than the first ionomer. Therefore, embodiments of the present disclosure include a cathode catalyst layer, comprising: a first sub-layer comprising a non-precious metal catalyst and a first ionomer, the first sub-layer being in contact with a proton exchange membrane; and a second sub-layer comprising the non-precious metal catalyst and a second ionomer with an equivalent weight that is higher than the equivalent weight of the first ionomer.

The term "equivalent weight" or "EW" refers to the weight of polymer in acid form (e.g., sulfonic acid groups) required to neutralize one equivalent of NaOH. A higher equivalent weight ionomer has fewer acid groups than in a low equivalent weight ionomer. In general, low equivalent weight ionomers have higher conductivity.

In particular embodiments, an ionomer used in embodiments of the present disclosure has an equivalent weight of 400 g/mol, 425 g/mol, 450 g/mol, 475 g/mol, 500 g/mol, 525 g/mol, 550 g/mol, 575 g/mol, 600 g/mol, 625 g/mol, 650 g/mol, 675 g/mol, 700 g/mol, 725 g/mol, 750 g/mol, 775 g/mol, 800 g/mol, 825 g/mol, 850 g/mol, 875 g/mol, 900 g/mol, 925 g/mol, 950 g/mol, 975 g/mol, 1000 g/mol, 1050 g/mol, 1100 g/mol, 1150 g/mol, or 1200 g/mol.

In some embodiments, an ionomer used in embodiments of the present invention has an equivalent weight ranging from about 300 g/mol to about 400 g/mol, from about 300 g/mol to about 500 g/mol, from about 300 g/mol to about 600 g/mol, from about 300 g/mol to about 700 g/mol, from about 300 g/mol to about 800 g/mol, from about 300 g/mol to about 900 g/mol, from about 300 g/mol to about 1000 g/mol, from about 300 g/mol to about 1100 g/mol, from about 300 g/mol to about 1200 g/mol, from about 350 g/mol to about 450 g/mol, from about 350 g/mol to about 550 g/mol, from about 350 g/mol to about 650 g/mol, from about 350 g/mol to about 750 g/mol, from about 350 g/mol to about 850 g/mol, from about 350 g/mol to about 950 g/mol, from about 350 g/mol to about 1050 g/mol, from about 350 g/mol to about 1150 g/mol, from about 400 g/mol to about 500 g/mol, from about 400 g/mol to about 600 g/mol, from about 400 g/mol to about 700 g/mol, from about 400 g/mol to about 800 g/mol, from about 400 g/mol to about 900 g/mol, from about 400 g/mol to about 1000 g/mol, from about 400 g/mol to about 1100 g/mol, from about 400 g/mol to about 1200 g/mol, from about 450 g/mol to about 550 g/mol, from about 450 g/mol to about 650 g/mol, from about 450 g/mol to about 750 g/mol, from about 450 g/mol to about 850 g/mol, from about 450 g/mol to about 950 g/mol, from about 450 g/mol to about 1050 g/mol, from about 450 g/mol to about 1150 g/mol, from about 500 g/mol to about 600 g/mol, from about 500 g/mol to about 700 g/mol, from about 500 g/mol to about 800 g/mol, from about 500 g/mol to about 900 g/mol, from about 500 g/mol to about 1000 g/mol, from about 500 g/mol to about 1100 g/mol, from about 500 g/mol to about 1200 g/mol, from about 550 g/mol to about 650 g/mol, from about 550 g/mol to about 750 g/mol, from about 550 g/mol to about 850 g/mol, from about 550 g/mol to about 950 g/mol, from about 550 g/mol to about 1050 g/mol, from about 550 g/mol to about 1150 g/mol, from about 600 g/mol to about 700 g/mol, from about 600 g/mol to about 800 g/mol, from about 600 g/mol to about 900 g/mol, from about 600 g/mol to about 1000 g/mol, from about 600 g/mol to about 1100 g/mol, from about 600 g/mol to about 1200 g/mol, from about 650 g/mol to about 750 g/mol, from about 650 g/mol to about 850 g/mol, from about 650 g/mol to about 950 g/mol, from about 650 g/mol to about 1050 g/mol, from about 650 g/mol to about 1150 g/mol, from about 700 g/mol to about 800 g/mol, from about 700 g/mol to about 900 g/mol, from about 700 g/mol to about 1000 g/mol, from about 700 g/mol to about 1100 g/mol, from about 700 g/mol to about 1200 g/mol, from about 750 g/mol to about 850 g/mol, from about 750 g/mol to about 950 g/mol, from about 750 g/mol to about 1050 g/mol, from about 750 g/mol to about 1150 g/mol, from about 800 g/mol to about 900 g/mol, from about 800 g/mol to about 1000 g/mol, from about 800 g/mol to about 1100 g/mol, from about 800 g/mol to about 1200 g/mol, from about 850 g/mol to about 950 g/mol, from about 850 g/mol to about 1050 g/mol, from about 850 g/mol to about 1150 g/mol, from about 900 g/mol to about 1000 g/mol, from about 900 g/mol to about 1100 g/mol, from about 900 g/mol to about 1200 g/mol, from about 950 g/mol to about 1050 g/mol, from about 950 g/mol to about 1150 g/mol, from about 1000 g/mol to about 1100 g/mol, from about 1000 g/mol to about 1200 g/mol, or from about 1050 g/mol to about 1150 g/mol.

When used in reference to a comparison of the equivalent weights of two ionomers (e.g., the first ionomer has a "lower" equivalent weight than the second ionomer, or the third ionomer has a "higher" equivalent weight than the first ionomer), the term "lower" can denote that the value stated is at least about 10 g/mol, at least about 25 g/mol, at least about 50 g/mol, at least about 75 g/mol, at least about 100 g/mol, or at least about 150 g/mol less than the compared value. In specific embodiments, the term "lower" denotes that the value stated is at least about 100 g/mol less than the compared value. Similarly, the term "higher," when used in the comparison of the equivalent weights of two ionomers can denote that the value stated is at least about 10 g/mol, at least about 25 g/mol, at least about 50 g/mol, at least about 75 g/mol, at least about 100 g/mol, or at least about 150 g/mol greater than the compared value. In specific embodiments, the term "higher" denotes that the value stated is at least about 100 g/mol greater than the compared value.

In some embodiments, the first catalyst sub-layer contains a low equivalent weight ionomer and the second catalyst sub-layer contains an ionomer with a higher equivalent weight. In embodiments, the first catalyst sub-layer contains a low equivalent weight ionomer and the second catalyst sub-layer contains a high equivalent weight ionomer. Therefore, embodiments of the present disclosure include a cathode catalyst layer, comprising: a first sub-layer comprising a non-precious metal catalyst and a first ionomer with a low equivalent weight, the first sub-layer being in contact with a proton exchange membrane; and a second sub-layer comprising the non-precious metal catalyst and a second ionomer with a high equivalent weight.

A "low equivalent weight" ionomer has an equivalent weight of less than 700 g/mol. In embodiments, a low equivalent weight ionomer used in embodiments of the present disclosure has an equivalent weight of 400 g/mol to 600 g/mol.

In some embodiments, a low equivalent weight ionomer has an equivalent weight ranging from about 300 g/mol to about 650 g/mol, from about 300 g/mol to about 600 g/mol, from about 300 g/mol to about 550 g/mol, from about 300 g/mol to about 500 g/mol, from about 300 g/mol to about 450 g/mol, from about 300 g/mol to about 400 g/mol, from about 300 g/mol to about 350 g/mol, from about 350 g/mol to about 650 g/mol, from about 350 g/mol to about 600 g/mol, from about 350 g/mol to about 550 g/mol, from about 350 g/mol to about 500 g/mol, from about 350 g/mol to about 450 g/mol, from about 350 g/mol to about 400 g/mol, from about 400 g/mol to about 650 g/mol, from about 400 g/mol to about 600 g/mol, from about 400 g/mol to about 550 g/mol, from about 400 g/mol to about 500 g/mol, from about 400 g/mol to about 450 g/mol, from about 450 g/mol to about 650 g/mol, from about 450 g/mol to about 600 g/mol, from about 450 g/mol to about 550 g/mol, from about 450 g/mol to about 500 g/mol, from about 500 g/mol to about 650 g/mol, from about 500 g/mol to about 600 g/mol, from about 500 g/mol to about 550 g/mol, from about 550 g/mol to about 650 g/mol, from about 550 g/mol to about 600 g/mol, or from about 600 g/mol to about 650 g/mol.

In particular embodiments, a low equivalent weight ionomer used in embodiments of the present disclosure has an equivalent weight of 400 g/mol, 425 g/mol, 450 g/mol, 475 g/mol, 500 g/mol, 525 g/mol, 550 g/mol, 575 g/mol, 600 g/mol, 625 g/mol, 650 g/mol, or 675 g/mol.

A "high equivalent weight" ionomer has an equivalent weight of at least 700 g/mol. In embodiments, a high equivalent weight ionomer used in embodiments of the present disclosure has an equivalent weight of 700 g/mol to 1200 g/mol.

In some embodiments, a high equivalent weight ionomer has an equivalent weight ranging from about 700 g/mol to about 1100 g/mol, from about 700 g/mol to about 1000 g/mol, from about 700 g/mol to about 950 g/mol, from about 700 g/mol to about 900 g/mol, from about 700 g/mol to about 850 g/mol, from about 700 g/mol to about 800 g/mol, from about 700 g/mol to about 750 g/mol, from about 750 g/mol to about 1000 g/mol, from about 750 g/mol to about 950 g/mol, from about 750 g/mol to about 900 g/mol, from about 750 g/mol to about 850 g/mol, from about 750 g/mol to about 800 g/mol, from about 800 g/mol to about 1100 g/mol, from about 800 g/mol to about 1000 g/mol, from about 800 g/mol to about 950 g/mol, from about 800 g/mol to about 900 g/mol, from about 800 g/mol to about 850 g/mol, from about 850 g/mol to about 1000 g/mol, from about 850 g/mol to about 950 g/mol, from about 850 g/mol to about 900 g/mol, from about 900 g/mol to about 1100 g/mol, from about 900 g/mol to about 1000 g/mol, from about 900 g/mol to about 950 g/mol, or from about 950 g/mol to about 1000 g/mol.

In particular embodiments, a high equivalent weight ionomer used in embodiments of the present disclosure has an equivalent weight of 700 g/mol, 725 g/mol, 750 g/mol, 775 g/mol, 800 g/mol, 825 g/mol, 850 g/mol, 875 g/mol, 900 g/mol, 925 g/mol, 950 g/mol, 975 g/mol, 1000 g/mol, 1050 g/mol, 1100 g/mol, 1150 g/mol, or 1200 g/mol.

In embodiments where one or more of the catalyst sub-layers contains a mixture of ionomers, one or more of the first catalyst sub-layer, the second catalyst sub-layer, the third catalyst sub-layer, the fourth catalyst sub-layer, and the fifth catalyst sub-layer contains a mixture of ionomers. For purposes of comparing the equivalent weight of the mixture of ionomers in one sub-layer as compared to the equivalent weight of an ionomer or a mixture of ionomers in another catalyst sub-layer, the equivalent weight of the mixture may be calculated by the following equation: equivalent weight of the mixture=(weight percent of ionomer 1)×(equivalent weight of ionomer 1)+(weight percent of ionomer 2)×(equivalent weight of ionomer 2)+ . . . (weight percent of ionomer n)×(equivalent weight of ionomer n).

In some embodiments, the first catalyst sub-layer contains an ionomer or a mixture of ionomers with a lower equivalent weight than the ionomer or the mixture of ionomers in the second catalyst sub-layer, and the second catalyst sub-layer contains an ionomer or a mixture of ionomers with higher equivalent weight than the ionomer or the mixture of ionomers in the first catalyst sub-layer.

In particular embodiments, the first catalyst sub-layer contains an ionomer or a mixture of ionomers with an equivalent weight ranging from 500 g/mol to 600 g/mol and the second catalyst sub-layer contains an ionomer or a mixture of ionomers with an equivalent weight ranging from 700 g/mol to 900 g/mol. In specific embodiments, the first catalyst sub-layer includes an ionomer with an equivalent weight of 500 g/mol and the second catalyst sub-layer includes an ionomer with an equivalent weight of 700 g/mol.

In embodiments, the first catalyst sub-layer contains an ionomer or a mixture of ionomers with an equivalent weight of less than or equal to 700 g/mol, and the second catalyst sub-layer contains an ionomer or a mixture of ionomers with an equivalent weight of greater than 700 g/mol. In other embodiments, the first catalyst sub-layer contains an ionomer or a mixture of ionomers with an equivalent weight ranging from 500 g/mol to 700 g/mol, and the second catalyst sub-layer contains an ionomer or a mixture of ionomers with an equivalent weight ranging from 900 g/mol to 1100 g/mol. In specific embodiments, the first catalyst sub-layer includes an ionomer with an equivalent weight of 700 g/mol, and the second catalyst sub-layer includes an ionomer with an equivalent weight of 1100 g/mol.

In embodiments with more than a first catalyst sub-layer and a second catalyst sub-layer, the catalyst sub-layer closest to the membrane will contain an ionomer or a mixture of ionomers with the lowest equivalent weight, and the other catalyst sub-layers will contain an ionomer or a mixture of ionomer with a lower equivalent weight than is present in the catalyst sub-layer(s) that are closer to the substrate.

In embodiments, the first catalyst sub-layer includes a first ionomer and a second ionomer with a higher equivalent weight than the equivalent weight of the first ionomer and the second catalyst sub-layer includes the second ionomer.

In some embodiments, the first catalyst sub-layer includes a first ionomer and a third ionomer that has an equivalent weight that is higher than the equivalent weight of the first ionomer, and the second catalyst sub-layer includes a second ionomer with a higher equivalent weight than the equivalent weight of the first ionomer.

In some embodiments, the first catalyst sub-layer includes a first ionomer and the second catalyst sub-layer includes a second ionomer with a higher equivalent weight than the first ionomer and a third ionomer that has an equivalent weight that is higher than the equivalent weight of the first ionomer.

In some embodiments, the first catalyst sub-layer includes a first ionomer with a lower equivalent weight than a second ionomer, and the second catalyst sub-layer includes the second ionomer with a lower equivalent weight than a third ionomer and the third ionomer.

In embodiments, the second catalyst sub-layer contains a second ionomer, and the first catalyst sub-layer contains a first ionomer that has a lower equivalent weight than the equivalent weight second ionomer and a third ionomer with a higher equivalent weight than the equivalent weight of the second ionomer.

In embodiments, the first catalyst sub-layer includes a first ionomer with a low equivalent weight and a second ionomer with a high equivalent weight and the second catalyst sub-layer includes the second ionomer.

In some embodiments, the first catalyst sub-layer includes a first ionomer with a low equivalent weight and a third ionomer that has an equivalent weight that is higher than the equivalent weight of the first ionomer, and the second catalyst sub-layer includes a second ionomer with a high equivalent weight.

In some embodiments, the first catalyst sub-layer includes a first ionomer with a low equivalent weight and the second catalyst sub-layer includes a second ionomer with a high equivalent weight and a third ionomer that has an equivalent weight that is higher than the equivalent weight of the first ionomer.

In some embodiments, the first catalyst sub-layer includes a first ionomer with a low equivalent weight and the second catalyst sub-layer includes a second ionomer with a high equivalent weight and a third ionomer that has an equivalent weight that is higher than the equivalent weight of the second ionomer.

In embodiments, the second catalyst sub-layer contains a high equivalent weight ionomer (second ionomer), and the first catalyst sub-layer contains a low equivalent weight ionomer (first ionomer) and a third ionomer with a higher equivalent weight than the equivalent weight of the second ionomer.

In embodiments, mixtures of ionomers contain an ionomer with a lower equivalent weight and an ionomer with a higher equivalent weight, by weight, in a ratio of about 1:1, about 1:2, about 1:3, about 1:4, about 1:5, about 2:3, about 2:4, about 2:5, about 3:4, about 3:5, or about 4:5.

In some embodiments, a catalyst sub-layer includes at least 5% (w/w), at least 10% (w/w), at least 15% (w/w), at least 20% (w/w), at least 25% (w/w), at least 30% (w/w), at least 35% (w/w), at least 40% (w/w), at least 45% (w/w), at least 50% (w/w), at least 55% (w/w), at least 60% (w/w), at least 65% (w/w), at least 70% (w/w), at least 75% (w/w), at least 80% (w/w), at least 85% (w/w), at least 90% (w/w), or at least 95% (w/w) of an ionomer of a particular equivalent weight.

In embodiments, a catalyst sub-layer includes from about 5% to about 10% (w/w), from about 5% to about 20% (w/w), from about 5% to about 25% (w/w), from about 5% to about 30% (w/w), from about 5% to about 40% (w/w), from about 5% to about 50% (w/w), from about 5% to about 60% (w/w), from about 5% to about 70% (w/w), from about 5% to about 75% (w/w), from about 5% to about 80% (w/w), from about 5% to about 90% (w/w), from about 10% to about 20% (w/w), from about 10% to about 30% (w/w), from about 10% to about 40% (w/w), from about 10% to about 50% (w/w), from about 10% to about 55% (w/w), from about 10% to about 60% (w/w), from about 10% to about 70% (w/w), from about 10% to about 80% (w/w), from about 10% to about 90% (w/w), from about 15% to about 35% (w/w), from about 15% to about 60% (w/w), from about 15% to about 85% (w/w), from about 20% to about 30% (w/w), from about 20% to about 40% (w/w), from about 20% to about 50% (w/w), from about 20% to about 60% (w/w), from about 20% to about 65% (w/w), from about 20% to about 70% (w/w), from about 20% to about 80% (w/w), from about 20% to about 90% (w/w), from about 25% to about 45% (w/w), from about 25% to about 70% (w/w), from about 25% to about 95% (w/w), from about 30% to about 40% (w/w), from about 30% to about 50% (w/w), from about 30% to about 60% (w/w), from about 30% to about 70% (w/w), from about 30% to about 75% (w/w), from about 30% to about 80% (w/w), from about 30% to about 90% (w/w), from about 35% to about 45% (w/w), from about 35% to about 55% (w/w), from about 35% to about 65% (w/w), from about 35% to about 75% (w/w), from about 35% to about 80% (w/w), from about 35% to about 85% (w/w), from about 40% to about 50% (w/w), from about 40% to about 60% (w/w), from about 40% to about 70% (w/w), from about 40% to about 80% (w/w), from about 40% to about 85% (w/w), from about 40% to about 90% (w/w), from about 45% to about 55% (w/w), from about 45% to about 65% (w/w), from about 45% to about 75% (w/w), from about 45% to about 85% (w/w), from about 45% to about 90% (w/w), from about 45% to about 95% (w/w), from about 50% to about 60% (w/w), from about 50% to about 70% (w/w), from about 50% to about 80% (w/w), from about 50% to about 90% (w/w), from about 50% to about 95% (w/w), from about 55% to about 65% (w/w), from about 55% to about 75% (w/w), from about 55% to about 85% (w/w), from about 55% to about 95% (w/w), from about 60% to about 70% (w/w), from about 60% to about 80% (w/w), from about 60% to about 90% (w/w), from about 65% to about 75% (w/w), from about 65% to about 85% (w/w), from about 65% to about 95% (w/w), from about 70% to about 80%

(w/w), from about 70% to about 90% (w/w), from about 75% to about 85% (w/w), from about 75% to about 95% (w/w), from about 80% to about 90% (w/w), from about 85% to about 95% (w/w) of an ionomer of a particular weight.

Each of the catalyst layers or sub-layers can be formed using any suitable method known in the art. For example, a catalyst ink may be applied to the GDL, membrane, or a carrier or release agent by various methods such as screen-printing, knife-coating, spraying, gravure coating, decal-transferring, painting, spraying, doctor-blading, air brushing, deskjet printing, inkjet printing, or a combination thereof.

"Catalyst ink" refers to a mixture of an ionomer solution and non-precious metal catalyst particles. Examples of suitable solvents include water, ethanol, propanol, ethylene glycol, hexane, kerosene, or tetrahydrofuran. In some embodiments, catalyst ink may also include tetrabutyl ammonium hydroxide.

The catalyst ink may be applied in a single coat or in multiple thin layers to achieve the desired catalyst loading and/or catalyst structure. In some embodiments, the catalyst layer(s) are applied directly on the PEM, i.e., forming a catalyst coated membrane. In other embodiments, the catalyst layer(s) are applied directly on the GDL substrate, i.e., forming a catalyst coated substrate.

In embodiments, different coating processes are utilized to form the catalyst layers or sub-layers. For example, the anode catalyst layer can be applied by screen printing and cathode catalyst layer can be applied by air brushing. In another example, the anode catalyst layer can be applied by air brushing, the first cathode catalyst sub-layer can be applied by inkjet printing, and the second cathode catalyst sub-layer can be applied by air brushing. In embodiments where the catalyst layers or sub-layers are formed by applying multiple thin coatings, different coating processes can be used to form one or more of the thin coatings.

In embodiments, decal-transferring is used to form the catalyst layer(s) or sub-layer(s). In such embodiments, multiple coatings can be applied to create each layer or sub-layer. In various embodiments, catalyst ink is coated on a smooth release agent, such as Kapton or Teflon film, by doctor-blading, air brushing, screen printing, deskjet printing, laser printing, or any other suitable method. After the ink is applied, the decal can be dried in an oven, which allows the solvents to be evaporated. After the ink dries, it is then transferred onto a PEM by hot press. The anode and the cathode can be simultaneously hot-pressed onto a PEM, or the anode and cathode can be hot-pressed onto the PEM in serial. The pressure and time used for the hot press varies for different types of MEAs as is understood by one of ordinary skill in the art.

"Loading" refers to the amount of material that is formed on or applied to a substrate, and is usually expressed as the mass of material per unit surface area of the substrate. Catalyst loading can be determined by weight and/or elemental analysis of a sheet-like sample with X-ray fluorescence spectroscopy (XRF).

In some embodiments, the loading of each of the catalyst layers or sub-layers ranges from 1 gram per square meter (gsm) to 100 gsm. In further embodiments, the loading of each catalyst layer ranges from about 1 gsm to about 50 gsm, from about 1 gsm to about 25 gsm, from about 5 gsm to about 100 gsm, from about 5 gsm to about 50 gsm, from about 5 gsm to about 25 gsm, from about 10 gsm to about 100 gsm, from about 10 gsm to about 50 gsm, from about 10 gsm to about 25 gsm, from about 10 gsm to about 20 gsm, from about 15 gsm to about 100 gsm, from about 15 gsm to about 50 gsm, from about 15 gsm to about 25 gsm, from about 20 gsm to about 100 gsm, from about 20 gsm to about 50 gsm, from about 20 gsm to about 25 gsm, from about 25 gsm to about 100 gsm, from about 25 gsm to about 50 gsm, from about 30 gsm to about 100 gsm, from about 30 gsm to about 50 gsm, from about 35 gsm to about 100 gsm, from about 35 gsm to about 50 gsm, from about 40 gsm to about 100 gsm, from about 40 gsm to about 50 gsm, from about 45 gsm to about 100 gsm, from about 45 gsm to about 50 gsm, from about 50 gsm to about 100 gsm, from about 75 gsm to about 100 gsm, from about 5 gsm to about 15 gsm, from about 5 gsm to about 25 gsm, from about 5 gsm to about 35 gsm, from about 5 gsm to about 45 gsm, from about 5 gsm to about 55 gsm, from about 5 gsm to about 65 gsm, from about 5 gsm to about 75 gsm, from about 5 gsm to about 85 gsm, from about 5 gsm to about 95 gsm, from about 10 gsm to about 20 gsm, from about 10 gsm to about 30 gsm, from about 10 gsm to about 40 gsm, from about 10 gsm to about 50 gsm, from about 10 gsm to about 60 gsm, from about 10 gsm to about 70 gsm, from about 10 gsm to about 80 gsm, from about 10 gsm to about 90 gsm, from about 20 gsm to about 30 gsm, from about 20 gsm to about 40 gsm, from about 20 gsm to about 50 gsm, from about 20 gsm to about 60 gsm, from about 20 gsm to about 70 gsm, from about 20 gsm to about 80 gsm, from about 20 gsm to about 90 gsm, from about 25 gsm to about 35 gsm, from about 25 gsm to about 45 gsm, from about 25 gsm to about 55 gsm, from about 25 gsm to about 65 gsm, from about 25 gsm to about 75 gsm, from about 25 gsm to about 85 gsm, or from about 25 gsm to about 95 gsm.

In some embodiments, the loading of each catalyst layer or sub-layer is about 10 gsm, about 15 gsm, about 20 gsm, about 25 gsm, about 30 gsm, about 35 gsm, about 40 gsm, about 45 gsm, about 50 gsm, about 55 gsm, about 60 gsm, about 65 gsm, about 70 gsm, about 75 gsm, about 80 gsm, about 85 gsm, about 90 gsm, about 95 gsm, or about 100 gsm.

Additionally, a compressing step may optionally be employed in forming the catalyst layers or sub-layers of the present disclosure, such that the resulting layer or sub-layer may be a desired thickness. In such embodiments, the compressing step includes compression between about 0.5 to 4,000 psi, 100 to 3,000 psi, 200 to 2,000 psi, or 300 to 1500 psi.

In embodiments, no catalyst sub-layer is the same thickness as another catalyst sub-layer. In other embodiments, a catalyst sub-layer is the same thickness as another catalyst sub-layer. In some embodiments, a catalyst sub-layer is a different thickness than another catalyst sub-layer.

In embodiments, each catalyst sub-layer has a thickness of about 5 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 105 μm, about 110 μm, about 115 μm, about 120 μm, about 125 μm, about 130 μm, about 135 μm, about 140 μm, about 145 μm, or about 150 μm.

In embodiments, each catalyst sub-layer has a thickness of at least about 5 μm, at least about 10 μm, at least about 15 μm, at least about 20 μm, at least about 25 μm, at least about 30 μm, at least about 35 μm, at least about 40 μm, at least about 45 μm, at least about 50 μm, at least about 55 μm, at least about 60 μm, at least about 65 μm, at least about 70 μm, at least about 75 μm, at least about 80 μm, at least about 85 μm, at least about 90 μm, at least about 95 μm, at least about 100 µm, at least about 105 µm, at least about 110 µm, at least about 115 µm, at least about 120 µm, at least about 125 µm, at least about 130 µm, at least about 135 µm, at least about 140 µm, at least about 145 µm, or at least about 150 µm.

In some embodiments, each catalyst sub-layer has a thickness ranging from about 5 µm to about 25 µm, from about 5 µm to about 50 µm, from about 5 µm to about 75 µm, from about 5 µm to about 100 µm, from about 5 µm to about 125 µm, from about 5 µm to about 145 µm, from about 10 µm to about 25 µm, from about 10 µm to about 50 µm, from about 10 µm to about 75 µm, from about 10 µm to about 100 µm, from about 10 µm to about 125 µm, from about 10 µm to about 145 µm, from about 20 µm to about 30 µm, from about 20 µm to about 40 µm, from about 20 µm to about 50 µm, from about 20 µm to about 60 µm, from about 20 µm to about 70 µm, from about 20 µm to about 80 µm, from about 20 µm to about 90 µm, from about 25 µm to about 35 µm, from about 25 µm to about 45 µm, from about 25 µm to about 50 µm, from about 25 µm to about 55 µm, from about 25 µm to about 65 µm, from about 25 µm to about 75 µm, from about 25 µm to about 75 µm, from about 25 µm to about 85 µm, from about 25 µm to about 95 µm, from about 25 µm to about 100 µm, from about 25 µm to about 125 µm, from about 25 µm to about 145 µm, from about 30 µm to about 40 µm, from about 30 µm to about 50 µm, from about 30 µm to about 60 µm, from about 30 µm to about 70 µm, from about 30 µm to about 80 µm, from about 30 µm to about 90 µm, from about 35 µm to about 45 µm, from about 35 µm to about 55 µm, from about 35 µm to about 65 µm, from about 35 µm to about 75 µm, from about 35 µm to about 85 µm, from about 35 µm to about 95 µm, from about 40 µm to about 50 µm, from about 40 µm to about 60 µm, from about 40 µm to about 70 µm, from about 40 µm to about 80 µm, from about 40 µm to about 90 µm, from about 45 µm to about 55 µm, from about 45 µm to about 65 µm, from about 45 µm to about 75 µm, from about 45 µm to about 85 µm, from about 45 µm to about 95 µm, from about 50 µm to about 75 µm, from about 50 µm to about 100 µm, from about 50 µm to about 125 µm, from about 50 µm to about 145 µm, from about 55 µm to about 65 µm, from about 55 µm to about 75 µm, from about 55 µm to about 85 µm, from about 55 µm to about 95 µm, from about 60 µm to about 70 µm, from about 60 µm to about 80 µm, from about 60 µm to about 90 µm, from about 75 µm to about 100 µm, from about 75 µm to about 125 µm, from about 75 µm to about 145 µm, from about 100 µm to about 125 µm, from about 100 µm to about 145 µm, or from about 125 µm to about 145 µm.

In embodiments, the catalyst layer has a total thickness of at least about 90 µm, at least about 95 µm, at least about 100 µm, at least about 105 µm, at least about 110 µm, at least about 115 µm, at least about 120 µm, at least about 125 µm, at least about 130 µm, at least about 135 µm, at least about 140 µm, at least about 145 µm, at least about 150 µm, at least about 155 µm, at least about 160 µm, at least about 165 µm, at least about 170 µm, at least about 175 µm, at least about 180 µm, at least about 185 µm, at least about 190 µm, at least about 195 µm, or at least about 200 µm.

In further embodiments, the catalyst layer has a total thickness ranging from 195 µm to 200 µm, from 190 µm to 200 µm, from 185 µm to 200 µm, from 180 µm to 200 µm, from 175 µm to 200 µm, from 170 µm to 200 µm, from 170 µm to 175 µm, from 165 µm to 200 µm, from 165 µm to 175 µm, from 160 µm to 200 µm, from 160 µm to 175 µm, from 155 µm to 200 µm, from 155 µm to 175 µm, from 150 µm to 200 µm, from 150 µm to 175 µm, from 145 µm to 200 µm, from 145 µm to 175 µm, from 145 µm to 150 µm, from 140 µm to 200 µm, from 140 µm to 175 µm, from 140 µm to 150 µm, from 135 µm to 200 µm, from 135 µm to 175 µm, from 135 µm to 150 µm, from 130 µm to 200 µm, from 130 µm to 175 µm, from 130 µm to 150 µm, from 125 µm to 200 µm, from 125 µm to 175 µm, from 125 µm to 150 µm, from 120 µm to 200 µm, from 120 µm to 175 µm, from 120 µm to 150 µm, from 120 µm to 125 µm, from 115 µm to 200 µm, from 115 µm to 175 µm, from 115 µm to 150 µm, from 115 µm to 125 µm, from 110 µm to 200 µm, from 110 µm to 175 µm, from 110 µm to 150 µm, from 110 µm to 125 µm, from 105 µm to 200 µm, from 105 µm to 175 µm, from 105 µm to 150 µm, from 105 µm to 125 µm, from 100 µm to 200 µm, from 100 µm to 175 µm, from 100 µm to 150 µm, from 100 µm to 125 µm, from 75 µm to 200 µm, from 75 µm to 175 µm, from 75 µm to 150 µm, from 75 µm to 125 µm, from 50 µm to 200 µm, from 50 µm to 175 µm, from 50 µm to 150 µm, or from 50 µm to 125 µm.

In various embodiments, the present disclosure provides for an MEA including any of the CCLs described above. As such, embodiments of the present disclosure include a membrane electrode assembly, comprising: a proton exchange membrane; a cathode comprising: a GDL; a CCL comprising: a cathode catalyst layer, comprising: a first sub-layer comprising a non-precious metal catalyst and a first ionomer, the first sub-layer being in contact with a proton exchange membrane; and a second sub-layer comprising the non-precious metal catalyst and a second ionomer with an equivalent weight that is higher than the equivalent weight of the first ionomer; and an anode. Embodiments of the present disclosure further include a membrane electrode assembly, comprising: a proton exchange membrane; a cathode comprising: a GDL; a CCL comprising: a first sub-layer comprising a non-precious metal catalyst and a first ionomer with a low equivalent weight, the first sub-layer being in contact with the proton exchange membrane; and a second sub-layer comprising the non-precious metal catalyst and a second ionomer with a high equivalent weight; and an anode.

In embodiments, the present disclosure provides for a fuel cell that includes any of the MEAs described above. In such embodiments, the MEAs described above are positioned between two electrically conductive flow field plates. Therefore, embodiments of the disclosure include a fuel cell comprising a membrane electrode assembly, comprising: a proton exchange membrane; a cathode comprising: a GDL; a cathode catalyst layer, comprising: a first sub-layer comprising a non-precious metal catalyst and a first ionomer, the first sub-layer being in contact with a proton exchange membrane; and a second sub-layer comprising the non-precious metal catalyst and a second ionomer with an equivalent weight that is higher than the equivalent weight of the first ionomer; and an anode. Embodiments of the disclosure also include a fuel cell comprising a membrane electrode assembly, comprising: a proton exchange membrane; a cathode comprising: a GDL; a CCL comprising: a first sub-layer comprising a non-precious metal catalyst and a first ionomer with a low equivalent weight, the first sub-layer being in contact with the proton exchange membrane; and a second sub-layer comprising the non-precious metal catalyst and a second ionomer with a high equivalent weight; and an anode.

In further embodiments, two or more fuel cells can be coupled to produce a fuel cell system.

Also disclosed herein are methods of making a MEA, fuel cell, or fuel cell system of the present disclosure, comprising: forming a cathode on a first side of a proton exchange membrane, the cathode comprising: a GDL; a CCL comprising a first sub-layer comprising a non-precious metal catalyst and a first ionomer, the first sub-layer being in contact with the proton exchange membrane; and a second sub-layer comprising the non-precious metal catalyst and a second ionomer with a higher equivalent weight than the equivalent weight of the first ionomer; and forming an anode on a second side of the proton exchange membrane. Further methods of the disclosure include methods of making a MEA, fuel cell, or fuel cell system of the present disclosure, comprising: forming a cathode on a first side of a proton exchange membrane, the cathode comprising: a GDL; a CCL comprising a first sub-layer comprising a non-precious metal catalyst and a first ionomer with a low equivalent weight, the first sub-layer being in contact with the proton exchange membrane; and a second sub-layer comprising the non-precious metal catalyst and a second ionomer with a high equivalent weight; and forming an anode on a second side of the proton exchange membrane.

Further, disclosed herein are methods of improving stability and/or performance of a MEA, fuel cell, or fuel cell system comprising: forming a cathode on a first side of a proton exchange membrane, the cathode comprising: a GDL; a CCL comprising a first sub-layer comprising a non-precious metal catalyst and a first ionomer, the first sub-layer being in contact with the proton exchange membrane; and a second sub-layer comprising the non-precious metal catalyst and a second ionomer with a higher equivalent weight than the first ionomer; and forming an anode on a second side of the proton exchange membrane. Additional methods include methods of improving stability and/or performance of a MEA, fuel cell, or fuel cell system comprising: forming a cathode on a first side of a proton exchange membrane, the cathode comprising: a GDL; a CCL comprising a first sub-layer comprising a non-precious metal catalyst and a first ionomer with a low equivalent weight, the first sub-layer being in contact with the proton exchange membrane; and a second sub-layer comprising the non-precious metal catalyst and a second ionomer with a high equivalent weight; and forming an anode on a second side of the proton exchange membrane. In some embodiments, the improved stability and/or performance of the MEA, fuel cell, or fuel cell system is in high relative humidity. "Relative humidity" refers to the amount of water vapor present in air expressed as a percentage of the amount needed for saturation at the same temperature. "High relative humidity" refers to relative humidity greater than 75%. "Low relative humidity" refers to relative humidity less than or equal to 75%.

EXAMPLES

Example 1

In order to test the utilization of a single layer CCL, two prototypes using carbon/nitrogen/oxygen/iron catalysts were created and tested, the first having a CCL loading of 40 gsm, and the second have a CCL loading of 25 gsm. Both prototype CCLs contained 40% (w/w) of an ionomer with an equivalent weight of 700 g/mol, and contained the same components and used the same methods but for the differing CCL loading.

Figure 3:
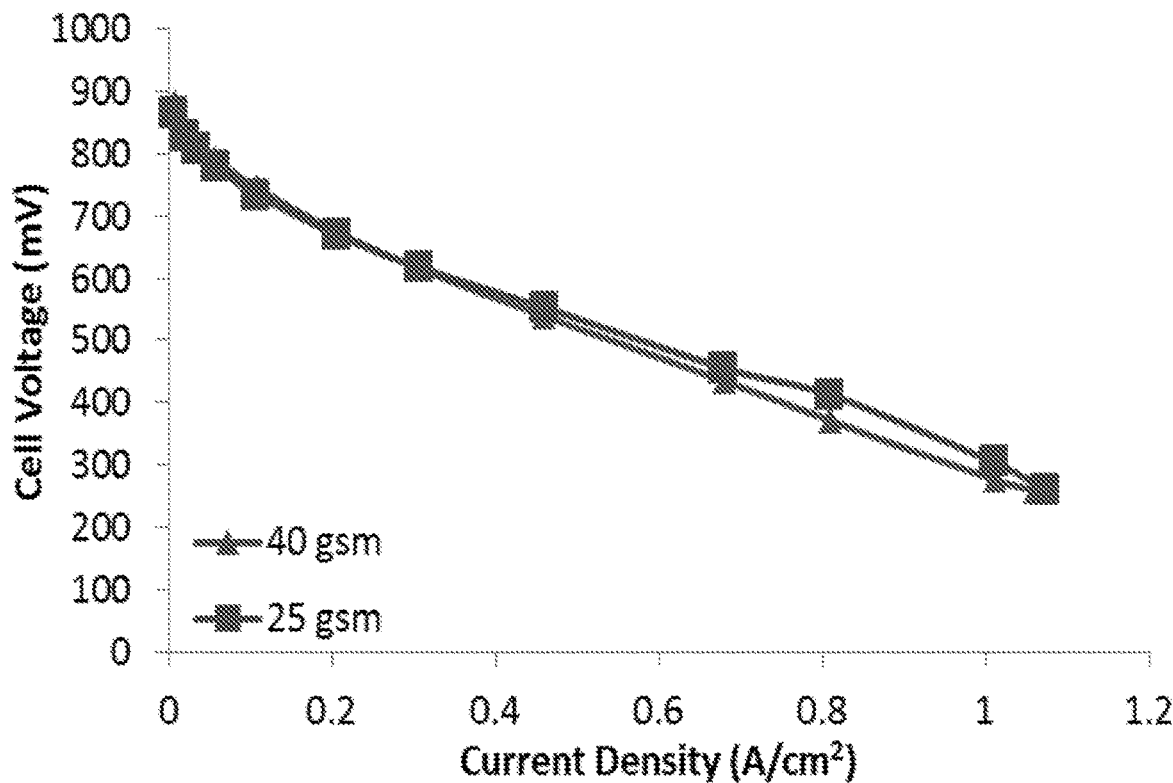
FIG. 3 shows the results of performance testing comparing two prototypes, one with cathode catalyst layer (CCL) loading of 40 gsm and one with a CCL loading of 25 gsm.

The results of the performance testing are shown in FIG. 3. As can be seen, the two designs show similar performance, which suggests that the CCL is not being fully utilized.

Example 2

In order to test performance of a high equivalent weight (EW) ionomer and a low equivalent weight ionomer at high relative humidity (RH) and low relative humidity, two prototypes using carbon/nitrogen/oxygen/iron catalysts were created and tested. Both of the prototypes had a CCL loading of 25 gsm, and contained the same components and used the same methods but for the differing ionomer. One prototype contained an ionomer with an equivalent weight of 500 g/mol ("low equivalent weight prototype"), and one prototype contained an ionomer with an equivalent weight of 700 g/mol ("high equivalent weight prototype"). The low equivalent weight prototype and high equivalent weight prototype were tested at 50% relative humidity and at 100% relative humidity.

Figure 4:
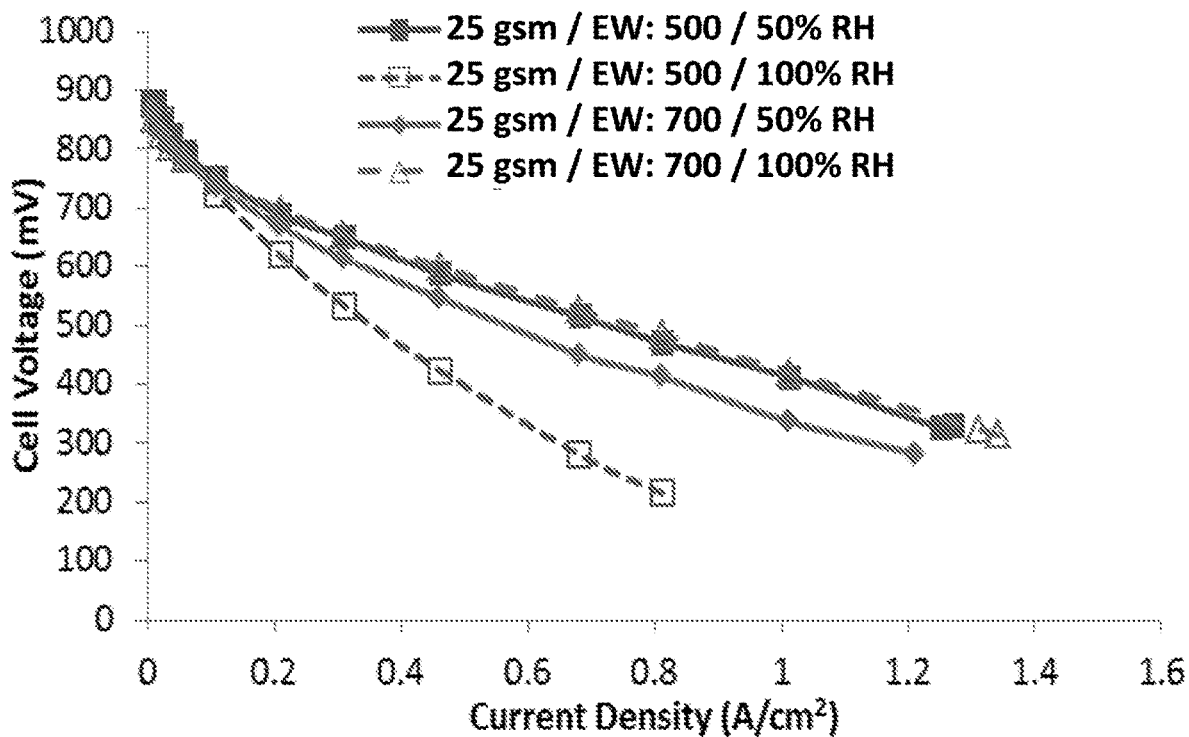
FIG. 4 shows the results of testing comparing the performance of two prototypes, one with a CCL containing a low equivalent weight ionomer and one with a CCL containing a high equivalent weight ionomer, at two relative humidities.

The results of the performance testing are shown in FIG. 4. As can be seen, the low equivalent weight prototype had excellent performance at 50% relative humidity, but experienced significant flooding at 100% relative humidity. In contrast, the high equivalent weight prototype had excellent performance at 100% relative humidity, but experienced poor performance at 50% relative humidity.

Example 3

In order to test whether the relative humidity tolerance of a CCL could be improved by mixing two ionomers in a single layer design, a prototype using a carbon/nitrogen/oxygen/iron catalyst with a mixed single layer CCL containing a 2:3 ratio of an ionomer with an equivalent weight of 500 g/mol and an ionomer with an equivalent weight of 700 g/mol was created. A second prototype using a carbon/nitrogen/oxygen/iron catalyst with a CCL containing only an ionomer with an equivalent weight of 500 g/mol ("low equivalent weight prototype") was also created. Both prototypes had a total CCL load of 25 gsm, and the CCLs contained a total of 40% (w/w) of ionomer. Other than the CCL composition, both prototypes contained the same components and used the same methods.

Figure 5:
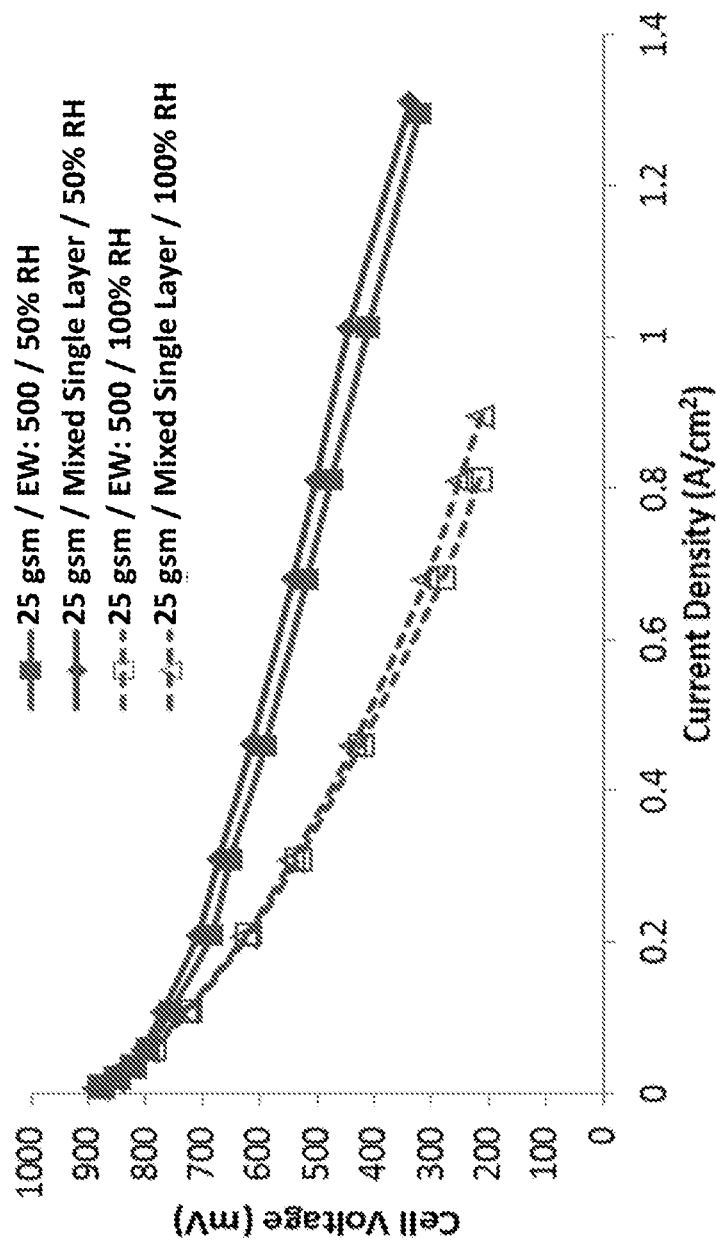
FIG. 5 shows the results of testing comparing the performance of two prototypes, one with a CCL containing a low equivalent weight ionomer and one with a CCL containing a mixture of two ionomers, at two relative humidities.

The results of the comparative tests are shown in FIG. 5. The mixed single layer CCL design had nearly identical performance to the low equivalent weight prototype. This suggests that even in a mixture with a ratio of 2:3, the ionomer with an equivalent weight of 500 g/mol dominated the behavior of the catalyst layer.

Example 4

A prototype containing a bi-layer CCL of the present disclosure was created in order to compare the performance with that of a traditional single layer CCL design. The bi-layer CCL design contained a first catalyst sub-layer and a second catalyst sub-layer. The first catalyst sub-layer, which was situated closest to the membrane, had a load of 10 gsm, and contained an ionomer with an equivalent weight of 500 g/mol. The second catalyst sub-layer had a load of 15 gsm and contained an ionomer with an equivalent weight of 700 g/mol. A second prototype with a CCL containing only an ionomer with an equivalent weight of 500 g/mol ("low equivalent weight prototype") was also created. Otherwise, both prototypes contained the same components and used the same methods. Both prototypes used carbon/nitrogen/oxygen/iron catalysts, had a total CCL load of 25 gsm, and the CCLs contained a total of 40% (w/w) of ionomer.

Figure 6:
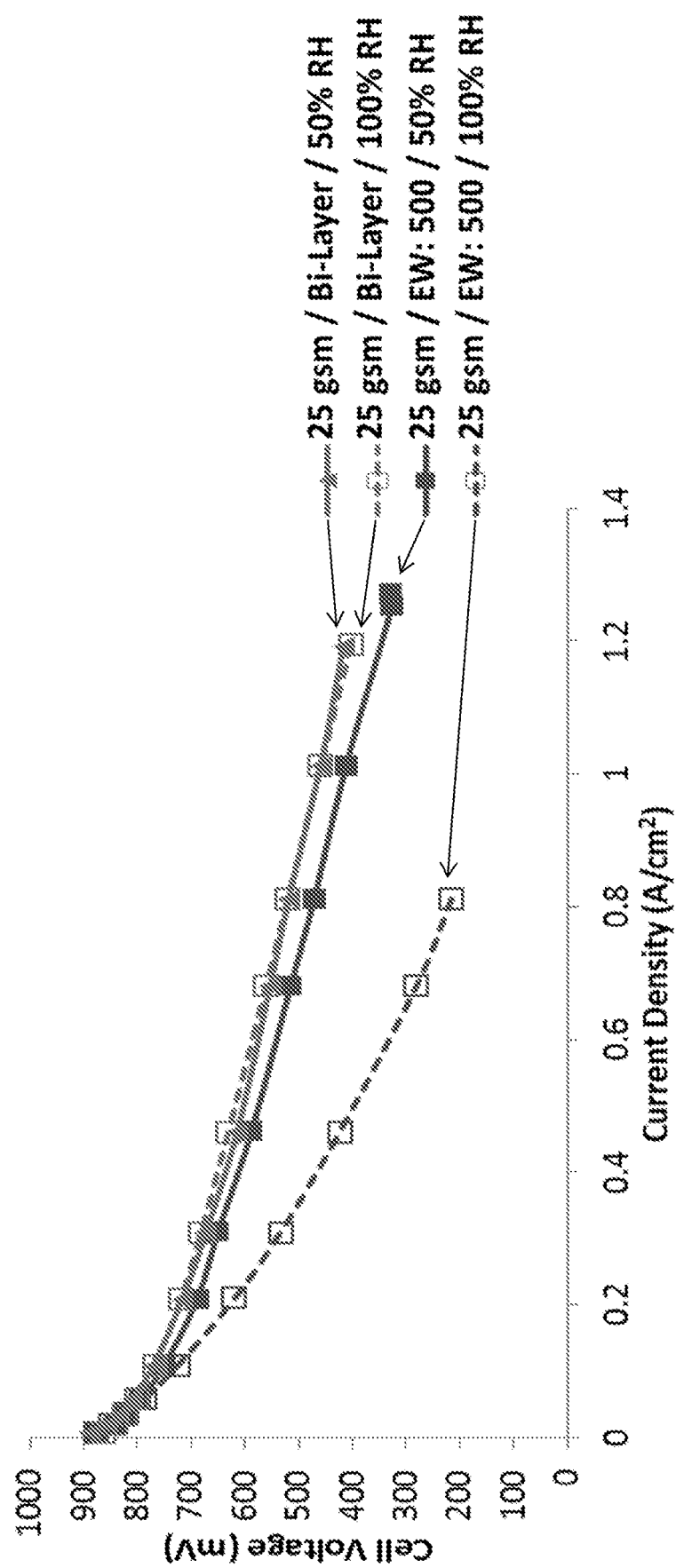
FIG. 6 shows the results of testing comparing the performance of two prototypes, one with a CCL containing a low equivalent weight ionomer and one with a bi-layer CCL design, at two relative humidities.

The prototypes were tested at 50% relative humidity and 100% relative humidity, and the results of these tests are shown in FIG. 6. As can be seen, the bi-layer CCL prototype had better performance at both 50% relative humidity and 100% relative humidity as compared to the low equivalent weight prototype. Further, there was no appreciable performance drop between the 50% relative humidity and the 100% relative humidity testing. Overall, the relative humidity tolerance of the bi-layer design was excellent.

Example 5

To compare the performance of the bi-layer CCL design and the mixed single layer CCL design, two prototypes using carbon/nitrogen/oxygen/iron catalysts were created. One was a prototype with a single layer CCL containing a 2:3 mixture of an ionomer with an equivalent weight of 500 g/mol and an ionomer with an equivalent weight of 700 g/mol. The other prototype had a bi-layer CCL design containing a first catalyst sub-layer and a second catalyst sub-layer. The first catalyst sub-layer, which was situated closest to the membrane, had a load of 10 gsm, and contained an ionomer with an equivalent weight of 500 g/mol. The second catalyst sub-layer had a load of 15 gsm and contained an ionomer with an equivalent weight of 700 g/mol. Both prototypes had a total CCL load of 25 gsm. Other than the CCL composition, both prototypes contained the same components and used the same methods.

Figure 7:
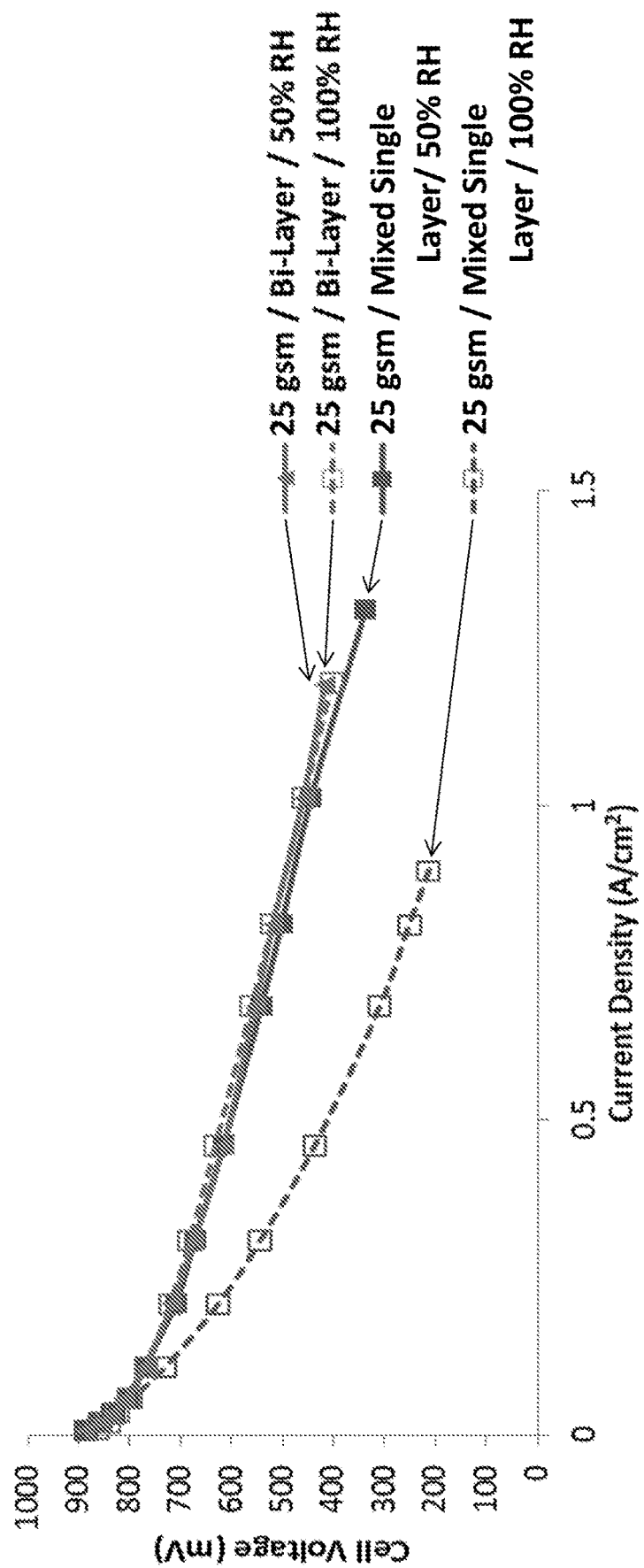
FIG. 7 shows the results of testing comparing the performance of two prototypes, one with a bi-layer CCL design and one with a CCL containing a mixture of two ionomers, at two relative humidities.

The mixed ionomer single layer CCL prototype and the bi-layer CCL prototype were tested at 50% relative humidity and 100% relative humidity. The results of these tests are shown in FIG. 7. Consistent with the results described in Example 3, and as shown in FIG. 5, the relative humidity tolerance of the mixed single layer CCL design was poor. At 50% relative humidity, the mixed single layer CCL design had excellent performance; however, at 100% relative humidity, the performance was much worse. Consistent with the results described in Example 4, and as shown in FIG. 6, the bi-layer CCL design had excellent performance at 50% relative humidity and 100% relative humidity, with little variation in performance between the two.

The following embodiments are included within the scope of the disclosure:

1. A cathode catalyst layer, comprising:
a first sub-layer comprising a non-precious metal catalyst and a first ionomer, the first sub-layer being in contact with a proton exchange membrane; and
a second sub-layer comprising the non-precious metal catalyst and a second ionomer with an equivalent weight that is higher than an equivalent weight of the first ionomer.

2. A cathode catalyst layer, comprising:
a first sub-layer comprising a non-precious metal catalyst and a first ionomer with a low equivalent weight, the first sub-layer being in contact with a proton exchange membrane; and
a second sub-layer comprising the non-precious metal catalyst and a second ionomer with a high equivalent weight.

3. The cathode catalyst layer of embodiment 1 or 2, wherein the first sub-layer further comprises the second ionomer.

4. The cathode catalyst layer of any one of embodiments 1-3, wherein the first sub-layer further comprises a third ionomer, the third ionomer having an equivalent weight that is higher than the equivalent weight of the first ionomer.

5. The cathode catalyst layer of any one of embodiments 1-4, wherein the first sub-layer comprises at least 25% (w/w), at least 30% (w/w), at least 35% (w/w), at least 40% (w/w), at least 45% (w/w), at least 50% (w/w), at least 55% (w/w), at least 60% (w/w), at least 65% (w/w), at least 70% (w/w), at least 75% (w/w), at least 80% (w/w), at least 85% (w/w), at least 90% (w/w), or at least 95% (w/w) of the first ionomer.

6. The cathode catalyst layer of any one of embodiments 1-5, wherein the first sub-layer comprises from 25% to 45% (w/w), from 25% to 70% (w/w), from 25% to 95% (w/w), from 30% to 40% (w/w), from 30% to 50% (w/w), from 30% to 60% (w/w), from 30% to 70% (w/w), from 30% to 75% (w/w), from 30% to 80% (w/w), from 30% to 90% (w/w), from 35% to 45% (w/w), from 35% to 55% (w/w), from 35% to 65% (w/w), from 35% to 75% (w/w), from 35% to 85% (w/w), from 40% to 50% (w/w), from 40% to 60% (w/w), from 40% to 70% (w/w), from 40% to 80% (w/w), from 40% to 90% (w/w), from 45% to 55% (w/w), from 45% to 65% (w/w), from 45% to 75% (w/w), from 45% to 85% (w/w), from 45% to 95% (w/w), from 50% to 60% (w/w), from 50% to 70% (w/w), from 50% to 80% (w/w), from 50% to 90% (w/w), from 55% to 65% (w/w), from 55% to 75% (w/w), from 55% to 85% (w/w), from 55% to 95% (w/w), from 60% to 70% (w/w), from 60% to 80% (w/w), from 60% to 90% (w/w), from 65% to 75% (w/w), from 65% to 85% (w/w), from 65% to 95% (w/w), from 70% to 80% (w/w), from 70% to 90% (w/w), from 75% to 85% (w/w), from 75% to 95% (w/w), from 80% to 90% (w/w), or from 85% to 95% (w/w) of the first ionomer.

7. The cathode catalyst layer of any one of embodiments 1-6, wherein the second sub-layer further comprises a third ionomer, the third ionomer having an equivalent weight that is higher than the equivalent weight of the first ionomer.

8. The cathode catalyst layer of any one of embodiments 1-7, wherein the second sub-layer further comprises a fourth ionomer, the fourth ionomer having an equivalent weight that is higher than the equivalent weight of the second ionomer.

9. The cathode catalyst layer of any one of embodiments 1-8, wherein the second sub-layer comprises at least 5% (w/w), 10% (w/w), 15% (w/w), 20% (w/w), 25% (w/w), 30% (w/w), 35% (w/w), at least 40% (w/w), at least 45% (w/w), at least 50% (w/w), at least 55% (w/w), at least 60% (w/w), at least 65% (w/w), at least 70% (w/w), at least 75% (w/w), at least 80% (w/w), at least 85% (w/w), at least 90% (w/w), or at least 95% (w/w) of the second ionomer.

10. The cathode catalyst layer of any one of embodiments 1-9, wherein the second sub-layer comprises from 5% to 25% (w/w), from 5% to 50% (w/w), from 5% to 75% (w/w), from 10% to 30% (w/w), from 10% to 55% (w/w), from 10% to 80% (w/w), from 15% to 35% (w/w), from 15% to 60% (w/w), from 15% to 85% (w/w), from 20% to 40% (w/w), from 20% to 65% (w/w), from 20% to 90% (w/w), from 25% to 45% (w/w), from 25% to 70% (w/w), from 25% to 95% (w/w), from 30% to 50% (w/w), from 30% to 75% (w/w), from 35% to 55% (w/w), from 35% to 80% (w/w), from 40% to 60% (w/w), from 40% to 85% (w/w), from 45% to 65% (w/w), from 45% to 90% (w/w), from 50% to 70% (w/w), from 50% to 95% (w/w), from 55% to 75% (w/w), from 60% to 80% (w/w), from 65% to 85% (w/w), from 70% to 90% (w/w), or from 75% to 95% (w/w) of the second ionomer.

11. The cathode catalyst layer of any one of embodiments 1-10, wherein the first sub-layer has a catalyst loading ranging from 5 gsm to 15 gsm.

12. The cathode catalyst layer of any one of embodiments 1-11, wherein the first sub-layer has a catalyst loading of about 10 gsm.

13. The cathode catalyst layer of any one of embodiments 1-12, wherein the first sub-layer has a thickness of at least 20 µm, at least 25 µm, at least 30 µm, at least 35 µm, at least 40 µm, at least 45 µm, at least 50 µm, at least 55 µm, at least 60 µm, or at least 65 µm.

14. The cathode catalyst layer of any one of embodiments 1-13, wherein the first sub-layer has a thickness ranging from 20 µm to 40 µm, from 20 µm to 50 µm, from 20 µm to 60 µm, from 20 µm to 70 µm, from 25 µm to 45 µm, from 25 µm to 55 µm, from 25 µm to 65 µm, from 25 µm to 75 µm, from 30 µm to 50 µm, from 30 µm to 60 µm, from 30 µm to 70 µm, from 30 µm to 80 µm, from 35 µm to 55 µm, from 35 µm to 65 µm, from 35 µm to 75 µm, from 40 µm to 60 µm, from 40 µm to 70 µm, from 40 µm to 80 µm, from 45 µm to 65 µm, from 45 µm to 75 µm, from 50 µm to 70 µm, from 50 µm to 80 µm, from 55 µm to 75 µm, or from 60 µm to 80 µm.

15. The cathode catalyst layer of any one of embodiments 1-14, wherein the first sub-layer has a thickness of at least 30 µm.

16. The cathode catalyst layer of any one of embodiments 1-15, wherein the second sub-layer has a catalyst loading ranging from 10 gsm to 20 gsm.

17. The cathode catalyst layer of any one of embodiments 1-16, wherein the second sub-layer has a catalyst loading of about 15 gsm.

18. The cathode catalyst layer of any one of embodiments 1-17, wherein the second sub-layer has a thickness of at least 35 µm, at least 40 µm, at least 45 µm, at least 50 µm, at least 55 µm, at least 60 µm, at least 65 µm, at least 70 µm, at least 75 µm, or at least 80 µm.

19. The cathode catalyst layer of any one of embodiments 1-18, wherein the second sub-layer has a thickness ranging from 35 µm to 55 µm, from 40 µm to 60 µm, from 45 µm to 65 µm, from 50 µm to 70 µm, from 55 µm to 75 µm, from 60 µm to 80 µm, from 65 µm to 85 µm, from 70 µm to 90 µm, from 35 µm to 65 µm, from 40 µm to 70 µm, from 45 µm to 75 µm, from 50 µm to 80 µm, from 55 µm to 85 µm, from 60 µm to 90 µm, from 35 µm to 75 µm, from 40 µm to 80 µm, from 45 µm to 85 µm, from 50 µm to 90 µm, from 35 µm to 85 µm, or from 40 µm to 90 µm.

20. The cathode catalyst layer of any one of embodiments 1-19, wherein the second sub-layer has a thickness of about 70 µm.

21. The cathode catalyst layer of any one of embodiments 1-20, wherein the second sub-layer is in contact with a gas diffusion layer (GDL).

22. The cathode catalyst layer of any one of embodiments 1-20, further comprising a third sub-layer comprising a fourth ionomer with an equivalent weight that is higher than the equivalent weight of the second ionomer.

23. The cathode catalyst layer of any one of embodiments 1 or 3-22, wherein the equivalent weight of the first ionomer is less than or equal to 700 g/mol, and the equivalent weight of the second ionomer is greater than 700 g/mol.

24. The cathode catalyst layer of any one of embodiments 1 or 3-23, wherein the equivalent weight of the first ionomer ranges from 500 g/mol to 700 g/mol and the equivalent weight of the second ionomer ranges from 900 g/mol to 1100 g/mol.

25. The cathode catalyst layer of any one of embodiments 1 or 3-24, wherein the equivalent weight of the first ionomer is about 700 g/mol and the equivalent weight of the second ionomer is about 1100 g/mol.

26. The cathode catalyst layer of any one of embodiments 1 or 3-22, wherein the equivalent weight of the first ionomer is a low equivalent weight.

27. The cathode catalyst layer of any one of embodiments 2-22 or 26, wherein the low equivalent weight ranges from 400 g/mol to 600 g/mol.

28. The cathode catalyst layer of any one of embodiments 2-22, 26, or 27, wherein the low equivalent weight is about 600 g/mol.

29. The cathode catalyst layer of any one of embodiments 2-22, 26, or 27, wherein the low equivalent weight is about 500 g/mol.

30. The cathode catalyst layer of any one of embodiments 2-22 or 27-29, wherein the high equivalent weight ranges from 700 g/mol to 1100 g/mol.

31. The cathode catalyst layer of any one of embodiments 2-22 or 27-30, wherein the high equivalent weight is about 700 g/mol.

32. The cathode catalyst layer of any one of embodiments 2-22 or 27-30, wherein the high equivalent weight is about 800 g/mol.

33. A membrane electrode assembly, comprising:
a proton exchange membrane;
a cathode comprising:
a gas diffusion layer (GDL);
a cathode catalyst layer (CCL) comprising:
a first sub-layer comprising a non-precious metal catalyst and a first ionomer, the first sub-layer being in contact with the proton exchange membrane; and
a second sub-layer comprising the non-precious metal catalyst and a second ionomer with an equivalent weight that is higher than an equivalent weight of the first ionomer; and
an anode.

34. A membrane electrode assembly, comprising:
a proton exchange membrane;
a cathode comprising:
a gas diffusion layer (GDL);
a cathode catalyst layer (CCL) comprising:
a first sub-layer comprising a non-precious metal catalyst and a first ionomer with a low equivalent weight, the first sub-layer being in contact with the proton exchange membrane; and
a second sub-layer comprising the non-precious metal catalyst and a second ionomer with a high equivalent weight; and
an anode.

35. The membrane electrode assembly of embodiment 33 or 34, wherein the first sub-layer further comprises the second ionomer.

36. The membrane electrode assembly of any one of embodiments 33-35, wherein the first sub-layer further comprises a third ionomer, the third ionomer having an equivalent weight that is higher than the equivalent weight of the first ionomer.

37. The membrane electrode assembly of any one of embodiments 33-36, wherein the first sub-layer comprises at least 25% (w/w), at least 30% (w/w), at least 35% (w/w), at least 40% (w/w), at least 45% (w/w), at least 50% (w/w), at least 55% (w/w), at least 60% (w/w), at least 65% (w/w), at least 70% (w/w), at least 75% (w/w), at least 80% (w/w), at least 85% (w/w), at least 90% (w/w), or at least 95% (w/w) of the first ionomer.

38. The membrane electrode assembly of any one of embodiments 33-37, wherein the first sub-layer comprises from 25% to 45% (w/w), from 25% to 70% (w/w), from 25% to 95% (w/w), from 30% to 40% (w/w), from 30% to 50% (w/w), from 30% to 60% (w/w), from 30% to 70% (w/w), from 30% to 75% (w/w), from 30% to 80% (w/w), from 30% to 90% (w/w), from 35% to 45% (w/w), from 35% to 55% (w/w), 35% to 65% (w/w), from 35% to 75% (w/w), from 35% to 85% (w/w), from 40% to 50% (w/w), from 40% to 60% (w/w), from 40% to 70% (w/w), from 40% to 80% (w/w), from 40% to 90% (w/w), from 45% to 55% (w/w), from 45% to 65% (w/w), from 45% to 75% (w/w), from 45% to 85% (w/w), from 45% to 95% (w/w), from 50% to 60% (w/w), from 50% to 70% (w/w), from 50% to 80% (w/w), from 50% to 90% (w/w), from 55% to 65% (w/w), from 55% to 75% (w/w), from 55% to 85% (w/w), from 55% to 95% (w/w), from 60% to 70% (w/w), from 60% to 80% (w/w), from 60% to 90% (w/w), from 65% to 75% (w/w), from 65% to 85% (w/w), from 65% to 95% (w/w), from 70% to 80% (w/w), from 70% to 90% (w/w), from 75% to 85% (w/w), from 75% to 95% (w/w), from 80% to 90% (w/w), or from 85% to 95% (w/w) of the first ionomer.

39. The membrane electrode assembly of any one of embodiments 33-38, wherein the second sub-layer further comprises a third ionomer, the third ionomer having an equivalent weight that is higher than the equivalent weight of the first ionomer.

40. The membrane electrode assembly of any one of embodiments 33-39, wherein the second sub-layer further comprises a fourth ionomer, the fourth ionomer having an equivalent weight that is higher than the equivalent weight of the second ionomer.

41. The membrane electrode assembly of any one of embodiments 33-40, wherein the second sub-layer comprises at least 5% (w/w), 10% (w/w), 15% (w/w), 20% (w/w), 25% (w/w), 30% (w/w), 35% (w/w), at least 40% (w/w), at least 45% (w/w), at least 50% (w/w), at least 55% (w/w), at least 60% (w/w), at least 65% (w/w), at least 70% (w/w), at least 75% (w/w), at least 80% (w/w), at least 85% (w/w), at least 90% (w/w), or at least 95% (w/w) of the second ionomer.

42. The membrane electrode assembly of any one of embodiments 33-41, wherein the second sub-layer comprises from 5% to 25% (w/w), 5% to 50% (w/w), 5% to 75% (w/w), 10% to 30% (w/w), 10% to 55% (w/w), 10% to 80% (w/w), 15% to 35% (w/w), 15% to 60% (w/w), 15% to 85% (w/w), 20% to 40% (w/w), 20% to 65% (w/w), 20% to 90% (w/w), 25% to 45% (w/w), 25% to 70% (w/w), 25% to 95% (w/w), 30% to 50% (w/w), 30% to 75% (w/w), 35% to 55% (w/w), 35% to 80% (w/w), 40% to 60% (w/w), 40% to 85% (w/w), 45% to 65% (w/w), 45% to 90% (w/w), 50% to 70% (w/w), 50% to 95% (w/w), 55% to 75% (w/w), 60% to 80% (w/w), 65% to 85% (w/w), 70% to 90% (w/w), or 75% to 95% (w/w) of the second ionomer.

43. The membrane electrode assembly of any one of embodiments 33-42, wherein the first sub-layer has a catalyst loading ranging from 5 gsm to 15 gsm.

44. The membrane electrode assembly of any one of embodiments 33-43, wherein the first sub-layer has a catalyst loading of about 10 gsm.

45. The membrane electrode assembly of any one of embodiments 33-44, wherein the first sub-layer has a thickness of at least 20 µm, at least 25 µm, at least 30 µm, at least 35 µm, at least 40 µm, at least 45 µm, at least 50 µm, at least 55 µm, at least 60 µm, or at least 65 µm.

46. The membrane electrode assembly of any one of embodiments 33-45, wherein the first sub-layer has a thickness ranging from 20 µm to 40 µm, from 20 µm to 50 µm, from 20 µm to 60 µm, from 20 µm to 70 µm, from 25 µm to 45 µm, from 25 µm to 55 µm, from 25 µm to 65 µm, from 25 µm to 75 µm, from 30 µm to 50 µm, from 30 µm to 60 µm, from 30 µm to 70 µm, from 30 µm to 80 µm, from 35 µm to 55 µm, from 35 µm to 65 µm, from 35 µm to 75 µm, from 40 µm to 60 µm, from 40 µm to 70 µm, from 40 µm to 80 µm, from 45 µm to 65 µm, from 45 µm to 75 µm, from 50 µm to 70 µm, from 50 µm to 80 µm, from 55 µm to 75 µm, or from 60 µm to 80 µm.

47. The membrane electrode assembly of any one of embodiments 33-46, wherein the first sub-layer has a thickness of at least 30 µm.

48. The membrane electrode assembly of any one of embodiments 33-47, wherein the second sub-layer has a catalyst loading ranging from 10 gsm to 20 gsm.

49. The membrane electrode assembly of any one of embodiments 33-48, wherein the second sub-layer has a catalyst loading of about 15 gsm.

50. The membrane electrode assembly of any one of embodiments 33-49, wherein the second sub-layer has a thickness of at least 35 µm, at least 40 µm, at least 45 µm, at least 50 µm, at least 55 µm, at least 60 µm, at least 65 µm, at least 70 µm, at least 75 µm, or at least 80 µm.

51. The membrane electrode assembly of any one of embodiments 33-50, wherein the second sub-layer has a thickness ranging from 35 µm to 55 µm, from 40 µm to 60 µm, from 45 µm to 65 µm, from 50 µm to 70 µm, from 55 µm to 75 µm, from 60 µm to 80 µm, from 65 µm to 85 µm, from 70 µm to 90 µm, from 35 µm to 65 µm, from 40 µm to 70 µm, from 45 µm to 75 µm, from 50 µm to 80 µm, from 55 µm to 85 µm, from 60 µm to 90 µm, from 35 µm to 75 µm, from 40 µm to 80 µm, from 45 µm to 85 µm, from 50 µm to 90 µm, from 35 µm to 85 µm, or from 40 µm to 90 µm.

52. The membrane electrode assembly of any one of embodiments 33-51, wherein the second sub-layer has a thickness of about 70 µm.

53. The membrane electrode assembly of any one of embodiments 33-52, wherein the second sub-layer is in contact with the GDL.

54. The membrane electrode assembly of any one of embodiments 33-52, wherein the CCL further comprises a third sub-layer comprising a fourth ionomer with an equivalent weight that is higher than the equivalent weight of the second ionomer.

55. The membrane electrode assembly of any one of embodiments 33 or 35-54, wherein the equivalent weight of the first ionomer is less than or equal to 700 g/mol, and the equivalent weight of the second ionomer is greater than 700 g/mol.

56. The membrane electrode assembly of any one of embodiments 33 or 35-55, wherein the equivalent weight of the first ionomer ranges from 500 g/mol to 700 g/mol and the equivalent weight of the second ionomer ranges from 900 g/mol to 1100 g/mol.

57. The membrane electrode assembly of any one of embodiments 33 or 35-56, wherein the equivalent weight of the first ionomer is about 700 g/mol and the equivalent weight of the second ionomer is about 1100 g/mol.

58. The membrane electrode assembly of any one of embodiments 33 or 35-54, wherein the equivalent weight of the first ionomer is a low equivalent weight.

59. The membrane electrode assembly of any one of embodiments 34-54 or 58, wherein the low equivalent weight ranges from 400 g/mol to 600 g/mol.

60. The membrane electrode assembly of any one of embodiments 34-54, 58, or 59, wherein the low equivalent weight is about 600 g/mol.

61. The membrane electrode assembly of any one of embodiments 34-54, 58, or 59, wherein the low equivalent weight is about 500 g/mol.

62. The membrane electrode assembly of any one of embodiments 34-54 or 59-61, wherein the high equivalent weight ranges from 700 g/mol to 1100 g/mol.

63. The membrane electrode assembly of any one of embodiments 34-54 or 59-62, wherein the high equivalent weight is about 700 g/mol.

64. The membrane electrode assembly of any one of embodiments 34-54 or 59-62, wherein the high equivalent weight is about 800 g/mol.

65. A fuel cell system, comprising a membrane electrode assembly of any one of embodiments 33-64 or a cathode catalyst layer of any one of embodiments 1-33.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet, including U.S. Patent Application No. 62/402,338, are incorporated herein by reference, in their entireties. Aspects of the embodiments can be modified, if necessary to employ concepts of the various patents, applications and publications to provide yet further embodiments.

In closing, it is to be understood that the embodiments of the disclosure disclosed herein are illustrative of the principles of the present disclosure. Other modifications that may be employed are within the scope of the disclosure. Thus, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A cathode catalyst layer, comprising:
a first sub-layer comprising
a non-precious metal catalyst, the non-precious metal catalyst including a non-precious metal that is a metal other than ruthenium, osmium, rhodium, iridium, palladium, platinum, gold, or silver, and
a first ionomer, the first sub-layer being configured to be in contact with a proton exchange membrane; and
a second sub-layer comprising
the non-precious metal catalyst and
a second ionomer with an equivalent weight that is higher than an equivalent weight of the first ionomer,
wherein the first ionomer and the second ionomer are each at least one thermoplastic resin stabilized by ionic cross-linkages.

2. The cathode catalyst layer of claim 1, wherein:
the equivalent weight of the first ionomer is a low equivalent weight; and
the equivalent weight of the second ionomer is a high equivalent weight.

3. The cathode catalyst layer of claim 1, wherein the first sublayer further comprises the second ionomer.

4. The cathode catalyst layer of claim 1, wherein the first sub-layer further comprises a third ionomer, the third ionomer having an equivalent weight that is higher than the equivalent weight of the first ionomer.

5. The cathode catalyst layer of claim 1, wherein the second sub-layer further comprises a third ionomer, the third ionomer having an equivalent weight that is higher than the equivalent weight of the first ionomer.

6. The cathode catalyst layer of claim 1, wherein the second sub-layer further comprises a fourth ionomer, the fourth ionomer having an equivalent weight that is higher than the equivalent weight of the second ionomer.

7. The cathode catalyst layer of claim 1, wherein the second sub-layer is in contact with a gas diffusion layer (GDL).

8. The cathode catalyst layer of claim 1, further comprising a third sub-layer comprising a fourth ionomer with an equivalent weight that is higher than the equivalent weight of the second ionomer.

9. A membrane electrode assembly, comprising:
a proton exchange membrane;
a cathode comprising:
a gas diffusion layer (GDL);
a cathode catalyst layer (CCL) comprising:
a first sub-layer that is in contact with the proton exchange membrane, the first sub-layer comprising
a non-precious metal catalyst, the non-precious metal catalyst including a non-precious metal that is a metal other than ruthenium, osmium, rhodium, iridium, palladium, platinum, gold, or silver, and
a first ionomer; and
a second sub-layer comprising
the non-precious metal catalyst and
a second ionomer with an equivalent weight that is higher than an equivalent weight of the first ionomer, wherein the first ionomer and the second ionomer are each at least one thermoplastic resin stabilized by ionic cross-linkages; and
an anode.

10. The membrane electrode assembly of claim 9, wherein the first sub-layer further comprises the second ionomer.

11. The membrane electrode assembly of claim 9, wherein the first sub-layer or the second sub-layer further comprises a third ionomer, the third ionomer having an equivalent weight that is higher than the equivalent weight of the first ionomer.

12. The membrane electrode assembly of claim 9, wherein
the first sub-layer comprises at least 25% (w/w) of the first ionomer; and
the second sub-layer comprises at least 5% (w/w) of the second ionomer.

13. The membrane electrode assembly of claim 9, wherein the second sub-layer further comprises a third ionomer, the third ionomer having an equivalent weight that is higher than the equivalent weight of the first ionomer.

14. The membrane electrode assembly of claim 9, wherein the second sub-layer further comprises a fourth ionomer, the fourth ionomer having an equivalent weight that is higher than the equivalent weight of the second ionomer.

15. A fuel cell system, comprising a membrane electrode assembly, comprising:
a cathode comprising:
a gas diffusion layer (GDL);
a cathode catalyst layer (CCL) comprising:
a first sub-layer that is in contact with the proton exchange membrane, the first sub-layer comprising
a non-precious metal catalyst, the non-precious metal catalyst including a non-precious metal that is a metal other than ruthenium, osmium, rhodium, iridium, palladium, platinum, gold, or silver, and a first ionomer; and a second sub-layer comprising the non-precious metal catalyst and a second ionomer with an equivalent weight that is higher than an equivalent weight of the first ionomer, wherein the first ionomer and the second ionomer are each at least one thermoplastic resin stabilized by ionic cross-linkages.

16. The fuel cell system of claim 15, wherein the first sub-layer has a catalyst loading ranging from 5 gsm to 15 gsm; and the second sub-layer has a catalyst loading ranging from 10 gsm to 20 gsm.

17. The fuel cell system of claim 15, wherein the first sub-layer has a thickness of at least 20 μm; and the second sub-layer has a thickness of at least 35 μm.

18. The fuel cell system of claim 15, wherein the CCL further comprises a third sub-layer comprising a fourth ionomer with an equivalent weight that is higher than the equivalent weight of the second ionomer.

19. The fuel cell system of claim 15, wherein the equivalent weight of the first ionomer is less than or equal to 700 g/mol, and the equivalent weight of the second ionomer is greater than 700 g/mol.

20. The fuel cell system of claim 15, wherein the equivalent weight of the first ionomer ranges from 400 g/mol to 600 g/mol, and the equivalent weight of the second ionomer ranges from 700 g/mol to 1100 g/mol.

* * * * *